(12) United States Patent
Hayashi et al.

(10) Patent No.: US 8,773,114 B2
(45) Date of Patent: Jul. 8, 2014

(54) APPARATUS FOR DETECTING DISPLACEMENT OF ELECTROMAGNETIC ACTUATOR

(75) Inventors: Yoshinori Hayashi, Iwata (JP); Akihiko Komatsu, Hamamatsu (JP)

(73) Assignee: Yamaha Corporation (JP)

( * ) Notice: Subject to any disclaimer, the term of this patent is extended or adjusted under 35 U.S.C. 154(b) by 559 days.

(21) Appl. No.: 13/071,832

(22) Filed: Mar. 25, 2011

(65) Prior Publication Data

US 2011/0234210 A1 Sep. 29, 2011

(30) Foreign Application Priority Data

Mar. 25, 2010 (JP) ................................. 2010-069938

(51) Int. Cl.
G01B 7/14 (2006.01)
(52) U.S. Cl.
USPC .................................................... 324/207.15
(58) Field of Classification Search
USPC .......... 324/207.11, 207.15, 207.17; 361/152; 290/40; 137/554; 91/361; 318/652
See application file for complete search history.

(56) References Cited

U.S. PATENT DOCUMENTS

| | | | | | |
|---|---|---|---|---|---|
| 5,012,722 | A | * | 5/1991 | McCormick | 91/361 |
| 5,170,065 | A | * | 12/1992 | Shimizu et al. | 290/40 C |
| 5,172,298 | A | * | 12/1992 | Shimizu et al. | 361/152 |
| 6,249,418 | B1 | * | 6/2001 | Bergstrom | 361/152 |
| 6,900,610 | B2 | * | 5/2005 | Deck et al. | 318/652 |
| 6,968,859 | B1 | * | 11/2005 | Nagano et al. | 137/554 |
| 2003/0146727 | A1 | * | 8/2003 | Ishii | 318/652 |

FOREIGN PATENT DOCUMENTS

| | | |
|---|---|---|
| CN | 1462363 A | 12/2003 |
| EP | 1480319 A2 | 11/2004 |
| JP | 61-284608 A | 12/1986 |
| JP | 07-224624 A | 8/1995 |
| JP | 7-224624 A | 8/1995 |
| JP | 07-274468 A | 10/1995 |
| JP | 10-020857 A | 1/1998 |
| JP | 11-082511 A | 3/1999 |
| JP | 2001-264004 A | 9/2001 |
| JP | 2005-201790 A | 7/2005 |

OTHER PUBLICATIONS

CN OA issued Jan. 23, 2013 for corres. CN201110048774.8.
Notification of Reason(s) for Refusal for corresponding JP 2010-069938, dated Sep. 26, 2013. English translation provided.

* cited by examiner

Primary Examiner — Reena Aurora
(74) Attorney, Agent, or Firm — Rossi Kimms & McDowell, LLP

(57) ABSTRACT

A displacement detecting apparatus of an electromagnetic actuator, including: an electromagnetic actuator including: a movable core; a drive coil which causes a displacement of the movable core; and a detection coil disposed at a position where a mutual coupling coefficient with the drive coil changes with the displacement, the actuator transmitting a drive force of the movable core to a mechanical system; a drive portion for supplying a drive current to the drive coil on the basis of a pulse width modulation signal; and a displacement detecting portion to which an output voltage of the detection coil is inputted, for outputting a displacement detection signal, wherein the displacement detecting portion includes: a sampling-signal generating portion for generating a sampling signal in synchronism with the pulse width modulation signal; and a synchronous sampling portion for outputting the displacement detection signal by sampling the output voltage in synchronism with the sampling signal.

14 Claims, 10 Drawing Sheets

TOP DEAD POINT

BOTTOM DEAD POINT

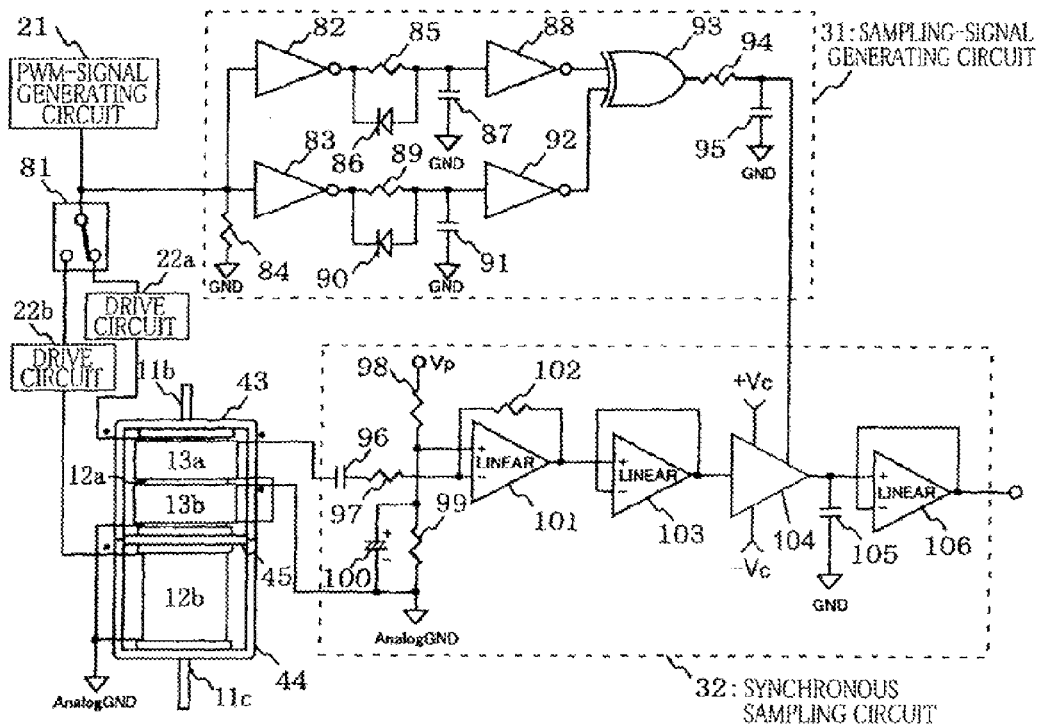
FIG.5A
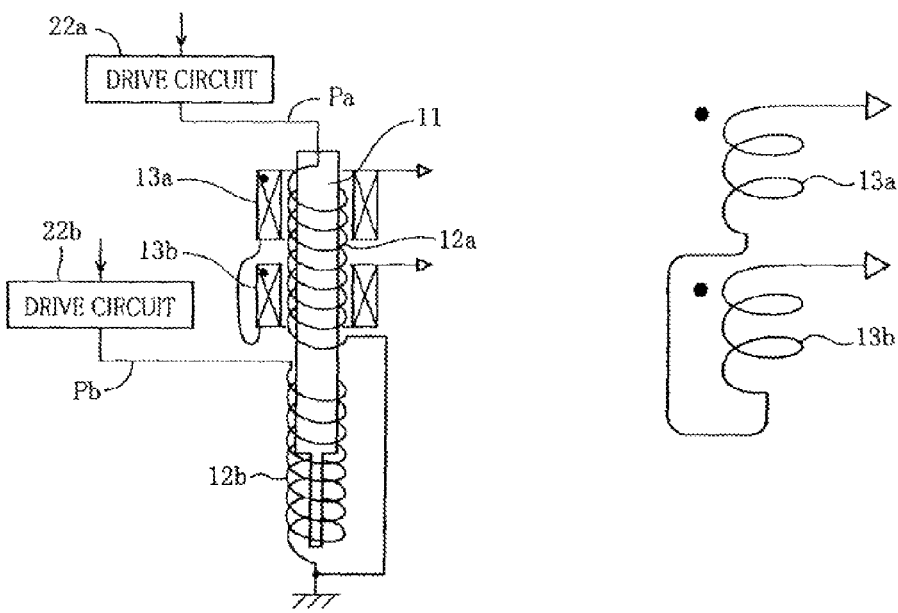 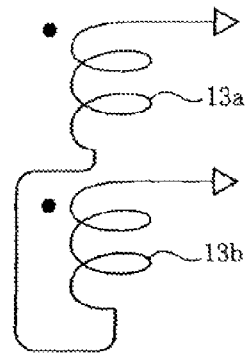
FIG.5B    FIG.5C

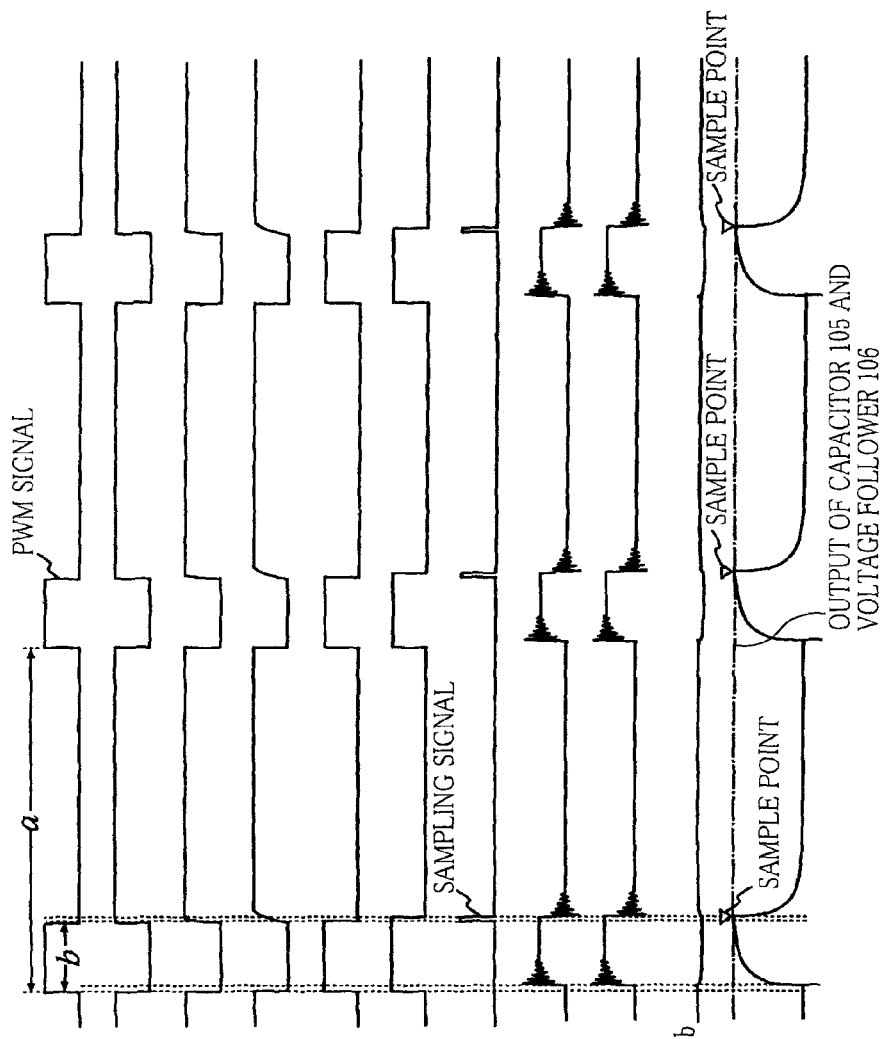

APPARATUS FOR DETECTING DISPLACEMENT OF ELECTROMAGNETIC ACTUATOR

CROSS REFERENCE TO RELATED APPLICATION

The present application claims priority from Japanese Patent Application No. 2010-069938, which was filed on Mar. 25, 2010, the disclosure of which is herein incorporated by reference in its entirety.

BACKGROUND OF THE INVENTION

1. Field of the Invention

The present invention relates to an apparatus for detecting a displacement of an electromagnetic actuator driven by a pulse width modulation signal. The electromagnetic actuator is used for generating a reaction force with respect to manipulation by a user and for allowing operating elements or members, valves and the like to be automatically operated, for instance.

2. Discussion of Related Art

In a keyboard apparatus of an electronic keyboard musical instrument, a drive mechanism is provided for each key to execute a control for increasing and decreasing a key touch feeling felt by a performer or player in a performance operation, i.e., a force sense control, or for allowing keys to be automatically operated without manipulation of the player to realize automatic performance, as disclosed in Patent Literature 1 below. The keyboard apparatus utilizes a two-way driving electromagnetic actuator. More specifically, in the electromagnetic actuator, a forward solenoid (forward coil) and a yoke configured to pivot a key in a key depression direction are disposed in series with a backward solenoid (backward coil) and a yoke configured to pivot the key in a key release direction. Further, a plunger (movable core) is inserted through the centers of these drive coils such that a drive shaft of the plunger contacts the key.

In the meantime, there is known a differential transformer as disclosed in Patent Literature 2 below for detecting a displacement position of a movable core by detecting a voltage induced by magnetic coupling.

Further, an electromagnetic actuator is used in a valve drive device of an internal combustion engine as disclosed in Patent Literatures 3 and 4 below.

CITATION LIST

Patent Literature 1: JP-A-10-20857
Patent Literature 2: JP-A-61-284608
Patent Literature 3: JP-A-7-224624
Patent Literature 4: JP-A-2001-264004

SUMMARY OF THE INVENTION

In an acoustic piano, there is obtained the key touch feeling that a magnitude of a reaction force changes in accordance with a stroke position of a key. In view of this, in the Patent Literature 1, a detection signal of a strain gauge or an optical sensor is outputted as positional information of the plunger or the key, and a drive current of the backward solenoid is controlled, thereby giving the key touch feeling. The disclosed apparatus, however, requires an expensive strain gauge or optical sensor.

In the differential transformer described in the Patent Literature 2, a primary-side coil to be energized by a sine wave and two differential-connected secondary-side coils are mutually connected via a movable core. This movable core, however, is used exclusively for detecting a displacement position thereof and does not function as a plunger.

Accordingly, where the differential transformer described in the Patent Literature 2 is employed for detecting the displacement position of the electromagnetic actuator described in the Patent Literature 1, a sine-wave oscillator is needed and the differential transformer needs to be disposed around the plunger. It is, however, difficult to ensure an installation space of the differential transformer for each key having a narrow width.

In the Patent Literature 3, a pulse width modulation signal is supplied to a drive coil, and a displacement detection coil is provided. On the basis of a change of self inductance of the displacement detection coil, an oscillating frequency is changed. This technique, however, needs the displacement detection coil, an oscillation circuit, and a voltage/frequency converting circuit.

In the Patent Literature 4, an alternating current for position detection is supplied to one of two drive coils of a two-way driving electromagnetic actuator, which one does not drive an armature (movable core). By detecting changes in the phase and the amplitude of the alternating current, a signal indicative of the displacement position of the armature is outputted. This technique, however, needs an oscillation circuit for an alternating signal.

It is therefore an object of the invention to provide a displacement detecting apparatus capable of detecting, by a simple structure, a displacement of an electromagnetic actuator driven in accordance with a pulse width modulation signal.

The object indicated above may be attained according to a principle of the present invention, which provides an apparatus for detecting a displacement of an electromagnetic actuator, comprising:

an electromagnetic actuator including: a movable core; a drive coil which causes a displacement of the movable core by giving a drive force to the movable core; and a detection coil which is disposed at a position where a mutual coupling coefficient with the drive coil changes in accordance with the displacement of the movable core, the electromagnetic actuator transmitting a drive force of the movable core to a mechanical system;

a drive portion configured to supply a drive current to the drive coil on the basis of a pulse width modulation signal; and a displacement detecting portion to which an output voltage of the detection coil is inputted and which is configured to output a displacement detection signal corresponding to the displacement of the movable core, wherein the displacement detecting portion includes: a sampling-signal generating portion configured to generate a sampling signal in synchronism with the pulse width modulation signal; and a synchronous sampling portion configured to output the displacement detection signal by sampling the output voltage of the detection coil in synchronism with the sampling signal.

According to the apparatus constructed as described above, the electromagnetic actuator has a simplified structure obtained by adding the detection coil to a conventionally constructed electromagnetic actuator, thereby ensuring a high degree of design freedom and a compact structure of the apparatus.

BRIEF DESCRIPTION OF THE DRAWINGS

The above and other objects, features, advantages and technical and industrial significance of the present invention will be better understood by reading the following detailed description of embodiments of the invention, when considered in connection with the accompanying drawings, in which:

FIG. 5A is a circuit diagram showing a specific example of a sampling-signal generating circuit and a synchronous sampling circuit shown in FIG. 1, FIG. 5B is a view schematically showing windings of respective forward coil and backward coil and a connection state thereof, together with the periphery of the coils, and FIG. 5C is a view schematically showing a winding of a main detection coil and an auxiliary detection coil and a connection state thereof;

FIG. 6 is a waveform diagram showing waveforms of signals respectively outputted from various portions in the circuits of FIG. 5;

DETAILED DESCRIPTION OF THE EMBODIMENTS

Figure 1:
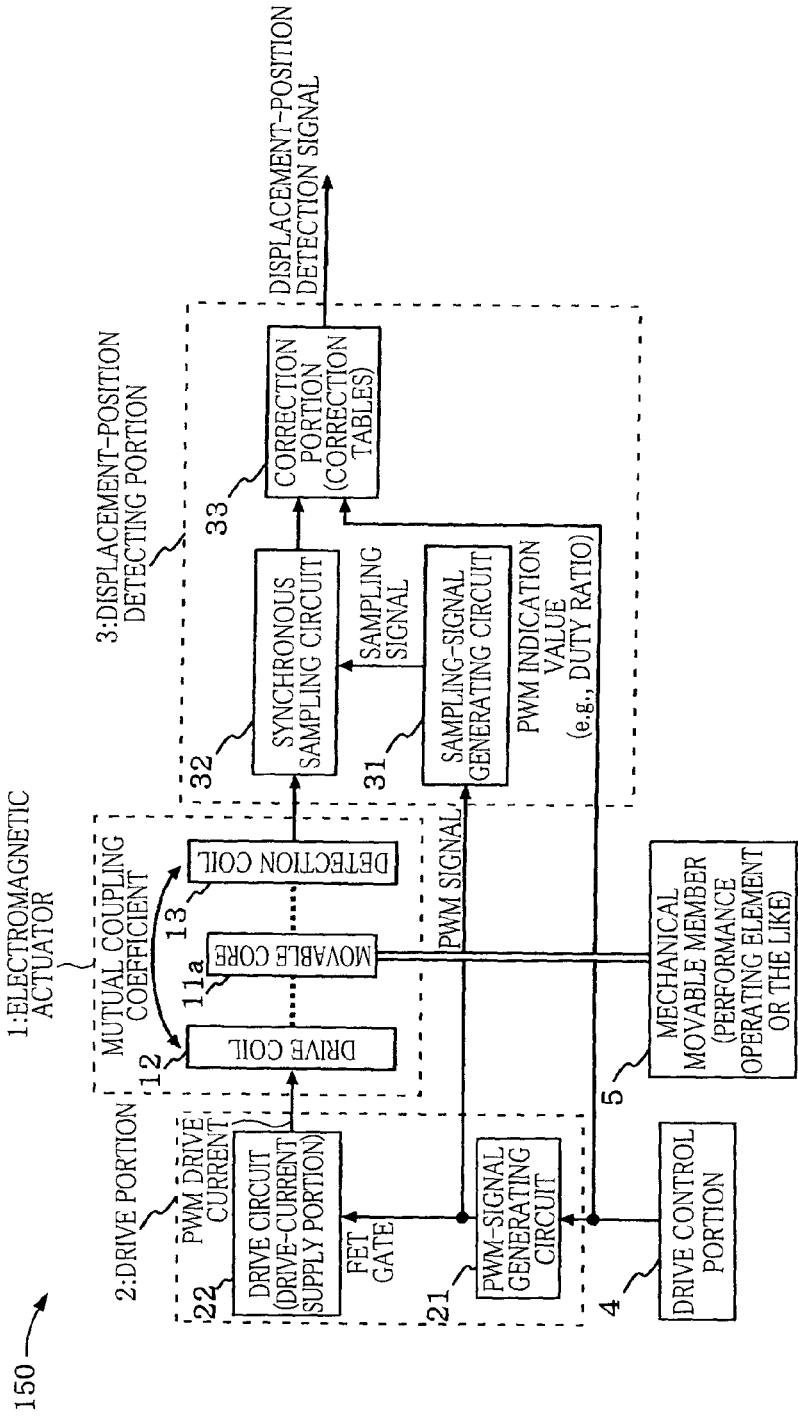
FIG. 1 is a functional block diagram for explaining one embodiment of the present invention.

FIG. 1 is a functional block diagram for explaining a detecting apparatus for detecting a displacement of an electromagnetic actuator according to one embodiment of the present invention. The detecting apparatus generally indicated at 150 in FIG. 1 is constituted by an electromagnetic actuator 1, a drive portion 2, and a displacement-position detecting portion 3. The electromagnetic actuator 1 shown in FIG. 1 includes a movable core (movable iron core) 11a and a drive coil 12. The movable core 11a is formed of a magnetic material and is one constituent element of a plunger 11 shown in FIG. 2. The electromagnetic actuator 1 transmits a drive force generated by electromagnetic induction to a mechanical movable member 5 such as a performance operating element like a key or a pedal of an electronic keyboard musical instrument, or a valve of an internal combustion engine. The electromagnetic actuator 1 additionally includes a detection coil 13.

The drive portion 2 is configured to displace the movable core 11a by giving a drive force thereto. The drive portion 2 includes a pulse width modulation (PWM) signal generating circuit 21 configured to output a PWM signal and a drive circuit 22 configured to supply a PWM drive current to the drive coil 12 in accordance with the PWM signal. The PWM-signal generating circuit 21 changes a duty ratio of the PWM signal in accordance with a directed value outputted from a drive control portion 4.

The detection coil 13 is disposed at a position where mutual induction with the drive coil, 12, namely, a mutual coupling coefficient (a mutual magnetic coupling coefficient), changes in accordance with a displacement position of the movable core 11a. More specifically, at the moment when an electric current to flow through the drive coil 12 is changed from off to on, there is generated magnetic flux. The detection coil 13 is disposed at a position where a change amount, from zero, of a part of the magnetic flux that penetrates the detection coil 13 changes in accordance with a displacement of the movable core 11a. Here, the displacement includes a displacement position and a displacement amount, of the movable core 11a, for instance.

Consequently, the detection coil 13 generates, owing to mutual induction, an induced electromotive force that changes in accordance with the displacement position of the movable core 11a. The above-indicated mutual coupling coefficient corresponds to mutual inductance (M) in an alternating electric circuit.

The displacement-position detecting portion 3 is configured to detect the displacement position of the movable core 11a on the basis of an output voltage of the detection coil 13 inputted thereto. The displacement-position detecting portion 3 includes: a sampling-signal generating circuit 31 configured to generate a sampling signal in synchronism with the PWM signal outputted from the PWM-signal generating circuit 21 of the drive portion 2; and a synchronous sampling circuit 32 configured to sample the output voltage of the detection coil 13 in synchronism with the sampling signal at timing of the sampling signal and to output a displacement-position detection signal to subsequent circuits.

The output of the synchronous sampling circuit 32 changes depending upon not only the displacement position of the movable core 11a, but also a duty ratio of the PWM signal, as later explained referring to FIG. 8. Accordingly, the displacement-position detecting portion 3 shown in FIG. 1 includes a correction portion 33. The correction portion 33 is configured to correct the displacement-position signal inputted thereto from the synchronous sampling circuit 32 in accordance with the duty ratio of the PWM signal outputted from the drive control portion 4 and to output the corrected displacement-position detection signal as an output of the displacement-position detecting portion 3.

According to this arrangement, the displacement-position detection signal which is not influenced by the duty ratio of the pulse width modulation signal is outputted. In addition, the displacement-position detection signal whose level is accurately proportional to the displacement of the movable core 11a can be outputted.

The displacement-position detection signal outputted from the synchronous sampling circuit 32 and/or the correction portion 33 is preferably outputted in a digital value. A concrete method for converting an analog value to a digital value will be later explained referring to FIG. 5.

The above-indicated drive control portion 4 is configured to output, to the PWM-signal generating circuit 21 and the correction portion 33, the directed value, e.g., the duty ratio, in accordance with the drive force to be given to the mechanical movable member 5 from the electromagnetic actuator 1. The PWM signal is repeatedly generated at a prescribed cycle. For increasing the drive force, a time during which the electric current flows through the drive coil 12, i.e., an energizing time, is increased by increasing the duty ratio.

The duty ratio from the drive control portion 4 is outputted to the correction portion 33, so that the correction portion 33 is capable of outputting the displacement-position detection signal which is not influenced by the duty ratio.

The magnetic flux generated by the drive coil 12 temporally changes by changing the electric current to be supplied to the drive coil 12 between on and off. There is generated, in the detection coil 13, an induced electromotive force in accordance with the change of the magnetic flux. Since the detection coil 13 is disposed at the position where the mutual coupling coefficient with the drive coil 12 changes in accordance with the displacement of the movable core 11a, the induced electromotive force generated in the detection coil 13 changes in accordance with the displacement position of the movable core 11a.

Figure 7:
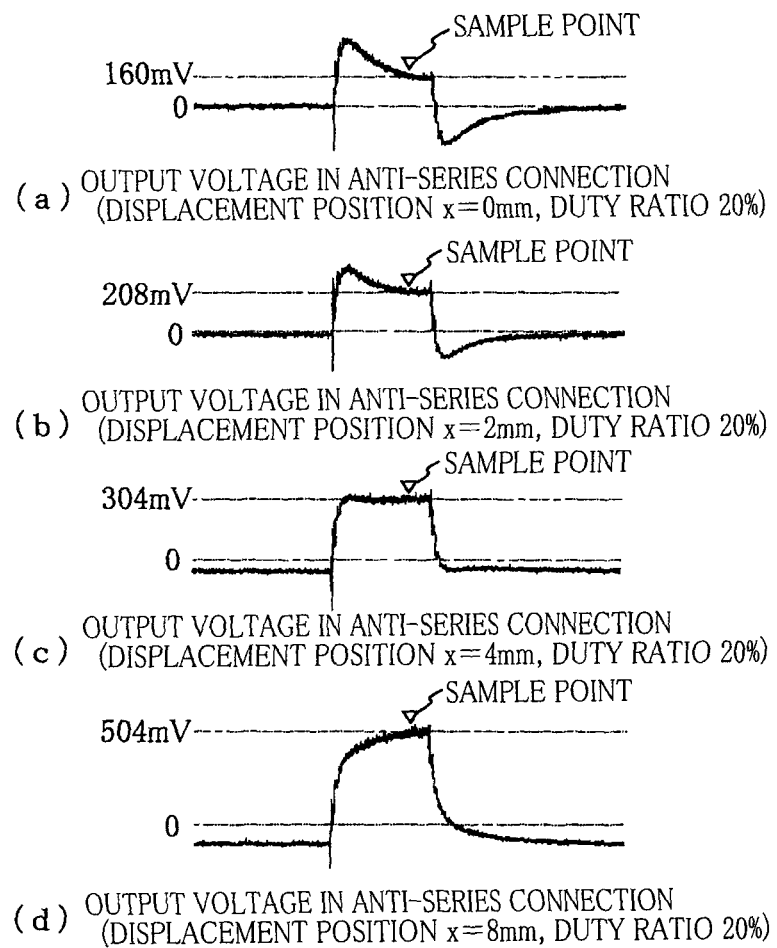
FIGS. 7(a)-7(d) are views each showing a waveform which indicates a relationship between: an output voltage of the main detection coil and the auxiliary detection coil of FIG. 5 which are connected in anti-series; and a displacement position of the movable core.

As shown in FIGS. 6 and 7, the electromotive force generated in the detection coil 13 temporally changes within one cycle of the PWM signal. Accordingly, the sapling-signal generating circuit 31 is configured to generate the sampling signal in phase suitable for detecting the displacement position of the movable core 11a. In general, a sample value outputted by the synchronous sampling circuit 32 is sample-held and is updated at timing of the next sampling signal. The sample value is an output corresponding to the present absolute position of the movable core 11a.

The output voltage of the detection coil 13 contains a component which does not change by the displacement position of the movable core 11a. The output voltage of the detection coil 13 also contains ringing and external noise. In view of this, the detection coil 13 is formed to have a main detection coil and an auxiliary detection coil, e.g., a main detection coil 13a and an auxiliary detection coil 13b in a specific example shown in FIG. 2.

The main detection coil 13a and the auxiliary detection coil 13b are disposed as follows. Namely, where a first mutual coupling coefficient of the drive coil 12 and the main detection coil 13a changes, as a first characteristic, in accordance with the displacement position of the movable core 11a while a second mutual coupling coefficient of the drive coil 12 and the auxiliary detection coil 13b changes, as a second characteristic, in accordance with the displacement position of the movable core 11a, the two coils 13a, 13b are disposed such that the first characteristic and the second characteristic differ from each other.

Figure 2:
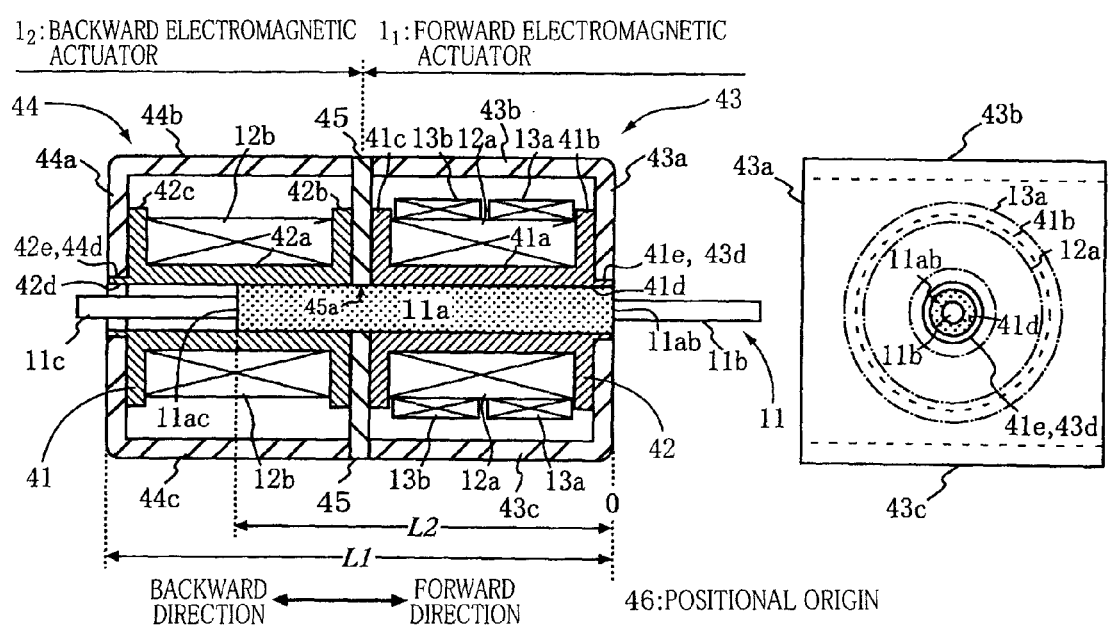
FIG. 2 is a structural view showing a first specific example of an electromagnetic actuator shown in FIG. 1.

As later explained in detail, the electromagnetic actuator 1 is of a two-way driving type and includes a forward electromagnetic actuator $1_1$ and a backward electromagnetic actuator $1_2$, as shown in FIG. 2. The main detection coil 13a and the auxiliary detection coil 13b are wound around a forward coil 12a of the forward electromagnetic actuator $1_1$, as shown in FIG. 2. Accordingly, the positional relationship of the main detection coil 13a, the auxiliary detection coil 13b, and the drive coil 12a may be explained as follows. That is, the main detection coil 13a, the auxiliary detection coil 13b, and the drive coil 12a are disposed such that opposite ends, in an axial direction of the forward coil 12a, of a winding wire of the main detection coil 13a and the auxiliary detection coil 13b, in other words, the right-side winding end of the main detection coil 13a in FIG. 2 and the left-side winding end of the auxiliary detection coil 13b in FIG. 2, are located inside respective positions of opposite ends of a winding wire of the drive coil 12a in the axial direction, namely, inside respective positions of the right-side winding end and the left-side winding end of the forward coil 12a in FIG. 2. Where the coils 12a, 13a, 13b are thus disposed, the main detection coil 13a and the auxiliary detection coil 13b can be formed integrally with the forward coil 12a, ensuring a more inexpensive and compact structure, as compared with an arrangement in which the coils 12a, 13a, 13b are formed so as to be independent of one another. Especially, in the present structure, the overall length of the coils 12a, 13a, 13b in the axial direction of the forward coil 12a does not increase beyond the axial length of the forward coil 12a, namely, the overall length of the coils 12a, 13a, 13b does not increase by an amount corresponding to the length of the main detection coil 13a and the length of the auxiliary detection coil 13b. Accordingly, the forward electromagnetic actuator $1_1$ can be made compact in the axial direction.

Where the main detection coil 13a and the auxiliary detection coil 13b are disposed as described above, the synchronous sampling circuit 32 is configured to sample an output voltage of the detection coil 13 constituted by the main detection coil 13a and the auxiliary detection coil 13b that are connected in anti-series such that the polarity of the above-indicated first mutual coupling coefficient and the polarity of the above-indicated second mutual coupling coefficient are opposite to each other, namely, connected in reverse-polarity series. The output voltage of the thus constituted detection coil 13 is a differential output voltage which is a difference between the output of the main detection coil 13a and the output of the auxiliary detection coil 13b.

As a result, according to the main detection coil 13a and the auxiliary detection coil 13b which are connected in anti-series as described above, not only the voltage component which does not depend on the displacement position of the movable core 11a, but also the ringing and the external noise are cancelled.

The ringing and the external noise generated by switching the drive current between on and off are applied to the main detection coil 13a and the auxiliary detection coil 13b in the same phase. According to the construction described above, the synchronous sampling circuit 32 samples the output voltage of the main detection coil 13a and the auxiliary detection coil 13b that are connected in the anti-series described above, whereby the displacement-position detection signal from which the ringing and the external noise are cancelled is outputted.

For instance, the auxiliary detection coil 13b is disposed at a position where the auxiliary detection coil 13b generates an induced electromotive force in accordance with the magnetic flux change of the drive coil 12 but the mutual coupling coefficient is unlikely to change by the displacement of the movable core 11a. For instance, the auxiliary detection coil 13b is disposed, with respect to the drive coil 12, at a position which is equal to or close to the position of the main detection coil 13a and is disposed so as to be adjacent to the main detection coil 13a in the displacement direction of the movable core 11a, i.e., in the axial direction of the drive coil 12. Further, the main detection coil 13a and the auxiliary detection coil 13b are disposed so as to be coaxial with the drive coil 12.

The output voltages of the respective main and auxiliary detection coils 13a, 13b contain a component which does not change in accordance with the displacement of the movable core 11a, the ringing component, and the external noise component. Since the main detection coil 13a and the auxiliary detection coil 13b are disposed so as to be coaxial with each other and so as to be arranged adjacent to each other in the direction of the displacement of the movable core 11a, it is considered that the main detection coil 13a and the auxiliary detection coil 13b contain these components to the same degree. Therefore, according to the arrangement, it is possible to obtain the displacement-position detection signal from which these components are well cancelled.

The above-indicated correction portion 33 stores correction tables or correction functions. The correction tables are used for converting the output voltage of the synchronous sampling circuit 32 to the displacement position of the movable core 11a. The correction functions are used for calculating the displacement position of the movable core 11a by using, as a parameter, the output voltage of the synchronous sampling circuit 32. Different kinds of the correction tables or the correction functions are prepared so as to correspond to different kinds of the duty ratios, and a suitable one of the different kinds is selected in accordance with the duty ratio obtained from the PWM-signal generating circuit 21.

The directed value (indicative of the duty ratio) of the PWM signal described above is outputted for controlling a drive force of the electromagnetic actuator 1. However, a displacement-position detection period in which the displacement position of the movable core 11a is detected may be set temporarily or periodically (e.g., at one cycle of ten cycles of the PWM signal) within a period in which the movable core 11a is driven or may be set temporarily or periodically (e.g., at one cycle of ten cycles of the PWM signal) within a non-driving period in which the movable core 11a is not driven. This non-driving period is a period in which electric current for driving the movable core 11a does not flow. Where a ratio of the displacement-position detection period with respect to an entire driving period in which the movable core 11a is driven is made small, the drive control of the electromagnetic actuator 1 is not influenced.

It is preferable that the drive control portion 4 output, in the displacement-position detection period, a directed value indicative of a duty ratio suitable for detection of the displacement position. For instance, there may be employed a duty ratio with which the output voltage of the detection coil 13 is high or a duty ratio by which the output voltage of the detection coil 13 largely changes with respect to the displacement position. Further, a small duty ratio which does not tend to influence the drive control is also suitable. The duty ratio may be set to a prescribed value as described above, and the displacement-position detection period may be a part of the entire driving period in which the movable core 11a is driven, as described above.

The PWM-signal generating circuit 21 sets a duty ratio to a prescribed value in the displacement-position detection period, the sampling-signal generating circuit 31 generates, in the displacement-detection period, a sampling signal which is synchronized with the PWM signal, and the correction portion 33 corrects a displacement-position detection signal inputted thereto from the synchronous sampling circuit 32 in accordance with the duty ratio set to the prescribed value.

The duty ratio can be set, in the displacement-position detection period, to the prescribed value suitable for detecting the displacement position, and the displacement of the movable core 11a can be accurately detected since the duty ratio is fixed to or kept at the prescribed value.

The above-indicated drive control portion 4 and correction portion 33 are realized by execution of a software program by a CPU, for instance. The output of the displacement-position detecting portion 3 indicative of the displacement position may be utilized for further detecting a displacement speed of the movable core 11a. In this instance, the CPU is configured to determine the drive force of the electromagnetic actuator 1 on the basis of the detected displacement position and the detected displacement speed, and the drive control portion 4 outputs, to the drive portion 2, a directed value corresponding to the determined drive force.

FIG. 2 is a structural view showing a first specific example of the electromagnetic actuator 1 of FIG. 1. In FIG. 2, the same reference signs are used to identify the corresponding components in FIG. 1.

As explained above, the electromagnetic actuator 1 is of a two-way driving type and includes the forward electromagnetic actuator $1_1$ and the backward electromagnetic actuator $1_2$. A movable core of the forward electromagnetic actuator $1_1$ and a movable core of the backward electromagnetic actuator $1_2$ are made common to each other, thereby constituting a single movable core 11a. The forward electromagnetic actuator $1_1$ and the backward electromagnetic actuator $1_2$ are disposed so as to be arranged in the displacement direction of the movable core 11a. The forward electromagnetic actuator $1_1$ is configured to drive the movable core 11a in a forward direction (i.e., in a rightward direction in FIG. 2) while the backward electromagnetic actuator $1_2$ is configured to drive the movable core 11a in a backward direction (i.e., in a leftward direction if FIG. 2). Here, the forward direction is defined as a direction of a drive force generated in the forward electromagnetic actuator $1_1$ while the backward direction is defined as a direction of a drive force generated in the backward electromagnetic actuator $1_2$. By using the two electromagnetic actuators $1_1$, $1_2$ each of which is a one-way driving type, the movable core 11a can be driven in opposite two directions. Since the movable core 11a is common to the two electromagnetic actuators $1_1$, $1_2$, this arrangement ensures more space saving, as compared with an arrangement in which two electromagnetic actuators are disposed independently of each other.

While the detection coil 13 (constituted by the main detection coil 13a and the auxiliary detection coil 13b) is provided only in the forward electromagnetic actuator $1_1$ in the example of FIG. 2, the detection coil 13 may be provided only in the backward electromagnetic actuator $1_2$ or may be provided in both of the two electromagnetic actuators $1_1$ and $1_2$. Where the detection coil 13 is provided in only one of the two electromagnetic actuators $1_1$ and $1_2$, the number of required components can be reduced. The detection coil 13 is provided in only one of the two electromagnetic actuators $1_1$ and $1_2$ in the following two instances: an instance where the detection of the displacement position is required only when the movable core 11a is driven in one direction; and an instance where the mutual coupling coefficient of the drive coil 12 and the detection coil 13 changes in accordance with the displacement of the movable core 11a when the drive current is supplied to the drive coil 12 of any two electromagnetic actuators $1_1$ and $1_2$.

The electromagnetic actuator 1 is of a solenoid type. The movable core 11a is a columnar body, specifically, a cylindrical body in the example of FIG. 2.

The movable core 11a is linearly displaceable in the axial direction of the columnar body by being inserted into a hollow portion, i.e., axial holes 41d, 42d of respective first and second bobbins 41, 42 in the example of FIG. 2. The hollow portion is constituted by a hollow section defined by the forward coil (drive coil) 12a and the detection coil 13 (constituted by the main detection coil 13a and the auxiliary detection coil 13b) and a hollow section defined by a backward coil (drive coil) 12b of the backward electromagnetic actuator $1_2$, which hollow sections are coaxially connected to each other.

The plunger 11 is constituted by the movable core 11a in the form of the columnar body and two drive shafts 11b, 11c formed on respective axially or longitudinally opposite end faces 11ab, 11ac of the movable core 11a so as to protrude therefrom. Each of the drive shafts 11b, 11c has a diameter smaller than that of the movable core 11a. The movable core 11a linearly displaces, whereby at least one of the two (first and second) drive shafts 11b, 11c transmits a drive force to the mechanical system. Only one of the first and second drive shafts 11b, 11c may be provided.

In FIG. 2, the reference signs "43", "44", and "45" respectively indicate a yoke in the forward electromagnetic actuator $1_1$, a yoke in the backward electromagnetic actuator $1_2$, and a partition yoke common to the two actuators. Each yoke is formed of a magnetic material and provides a passage through which magnetic lines of force and the movable core 11a pass.

Each of the yokes 43 and 44 is a U-shaped member obtained by bending a rectangular flat plate member at right angles such that two side portions 43b and 43c; 44b and 44c are formed on respective opposite ends of an end face 43a; 44a that defines the bottom of the U shape. There are formed bobbin insertion holes 43d, 44d respectively at centers of the respective end faces 43a, 44a. In the example of FIG. 2, each of the bobbin insertion holes 43d, 44d also functions as a plunger insertion hole. Similarly, there is formed a plunger insertion hole 45a at a center of the partition yoke 45.

The yoke 43 and the partition yoke 45 are disposed outside the forward coil 12a, the main detection coil 13a, and the auxiliary detection coil 13b, and the bobbin insertion hole 43d of the yoke 43 functions as an opening through which the first drive shaft 11b protrudes from the yoke 43. Similarly, the yoke 44 and the partition yoke 45 are disposed outside the backward coil 12b, and the bobbin insertion hole 44d of the yoke 44 functions as an opening through which the second drive shaft 11c protrudes from the yoke 44.

The yokes described above are provided for intensifying the drive force given by each of the forward coil 12a and the backward coil 12b to the movable core 11a, and are not essential. The partition yoke 45 separates a magnetic circuit of the forward electromagnetic actuator $1_1$ and a magnetic circuit of the backward electromagnetic actuator $1_2$ from each other. It is noted that the magnetic circuits of the two actuators are not completely separated because the yokes 43, 44 partially enclose the forward coil 12a and the backward coil 12b, respectively.

Owing to the presence of the yokes 43-45, the magnetic resistance of each magnetic circuit passing through the movable core 11a is made small, whereby the drive force of each of the electromagnetic actuators $1_1$, $1_2$ increases.

By increasing the axial length of the movable core in the form of the columnar body and the axial length of the drive coil and by decreasing the number of layers of the drive coil, it is possible to easily increase the distance by which the movable core is displaceable and to easily decrease an installation area of the electromagnetic actuator without decreasing the number of turns of the drive coil. Accordingly, this arrangement is suitable for detecting the displacement of the electromagnetic actuator used in an apparatus, such as a keyboard apparatus, in which the installation space of the electromagnetic actuator for each key has a small width.

Each of the bobbins 41 and 42 is formed of a synthetic resin and includes a cylindrical winding portion 41a; 42a and two flange portions 41b and 41c; 42b and 42c formed at respective opposite ends of the winding portion 41a; 42a. The above-indicated axial holes 41d, 42d of the respective bobbins 41, 42 are formed through the respective winding portions 41a, 42a in the axial direction. Annular stepped portions 41e, 42e are formed at the respective flange portions 41b, 42c, whereby the opening positions of the respective axial holes 41d, 42d are located more distantly from the corresponding flange portions 41b, 42c in the axial direction.

The first bobbin 41 and the second bobbin 42 are disposed so as to be arranged in the displacement direction of the movable core 11a, such that the flange portion 41c of the first bobbin 41 and the flange portion 42b of the second bobbin 42 are adjacent to each other with the partition yoke 45 interposed therebetween and such that the center of the axial hole 41d and the center of the axial hole 42d are aligned with each other.

The forward coil 12a and the backward coil 12b are wound around the respective winding portions 41a, 42a of the first and second bobbins 41, 42. In the example of FIG. 2, the detection coil 13 (constituted by the main detection coil 13a and the auxiliary detection coil 13b) is wound on the outer circumference of the forward coil 12a so as to be superposed thereon, thereby providing a layered structure.

To the contrary, the drive coil 12 (the forward coil 12a) may be superposed on the detection coil 13 after winding of the detection coil 13 around the winding portions 41a, 42a. In place of the layered structure, the drive coil 12 (the forward coils 12a) may be interposed between the main detection coil 13a and the auxiliary detection coil 13b such that the three coils are arranged side by side in the axial direction.

The main detection coil 13a is wound on a portion of the forward coil 12a, which portion is nearer to a positional origin 46 in the displacement direction of the movable core 11a while the auxiliary detection coil 13b is wound on a portion of the forward coil 12a, which portion is distant from the positional origin 46 and is nearer to the partition yoke 45. As shown in FIG. 2, the positional origin 46 is located at a position outside the end face 43a of the yoke 43.

Typically, the two detection coils 13a, 13b have the same number of turns and are disposed symmetrically with respect to a plane obtained by dividing the forward coil 12a at its axially middle portion. These conditions, however, are not essential.

In the forward electromagnetic actuator $1_1$, when the PWM drive current is supplied to the forward coil 12a from the drive circuit 22 shown in FIG. 1, there is generated a drive force such that the movable core 11a displaces to a position at which the magnetic resistance of the magnetic circuit of the actuator $1_1$ is minimum. In this instance, the magnitude of the drive force changes depending upon the duty ratio of the PWM drive current and the displacement position of the movable core 11a.

In the example of FIG. 2, the movable core 11a moves in the forward direction, i.e., moves toward a position at which the end face 11ab of the movable core 11a and the outer surface of the end face 43a of the yoke 43 are substantially flush with each other.

The above-indicated end face 11ab is attracted to an outer edge of the bobbin insertion hole 43d which defines a border with the end face 43a and an inner edge of the bobbin insertion hole 43d which defines a border with the flange portion 41b. A state in which the end face 11ab and the outer surface of the end face 43a are substantially flush with each other corresponds to a top dead point of the movable core 11a. The top dead point defines the above-indicated positional origin 46.

Where the above-indicated bobbin insertion hole 43d is formed as a reverse-tapered hole, namely, where the bobbin insertion hole 43d is formed to make an acute angle with respect to the end face 43a, an attraction force of the above-indicated outer edge becomes larger than that of the above-indicated inner edge, so that the above-indicated top dead point becomes close to the outer surface of the end face 43a.

Similarly, in the backward electromagnetic actuator $1_2$, when the PWM drive current is supplied to the backward coil 12b, there is generated a drive force such that the movable core 11a displaces to a position at which the magnetic resistance of the magnetic circuit of the actuator $1_2$ is minimum.

In the example of FIG. 2, the movable core 11a moves in the backward direction, i.e., moves toward a position at which the end face 11ac of the movable core 11a and an outer surface of the end face 44a of the yoke 44 are substantially flush with each other.

Here, a distance between the outer surface of the end face 43a and the outer surface of the end face 44a is expressed as L1 while the length of the movable core 11a is expressed as L2. In the illustrated example, L2 is substantially equal to L1×(¾). Where a distance from the outer surface of the end face 43a, i.e., from the positional origin 46, to the end face 11ab of the movable core 11a is expressed as x, the two-way driving and the detection of the displacement position are possible roughly within a range of 0≤x<L1×(¼).

Figures 3A, 3B, 3C:
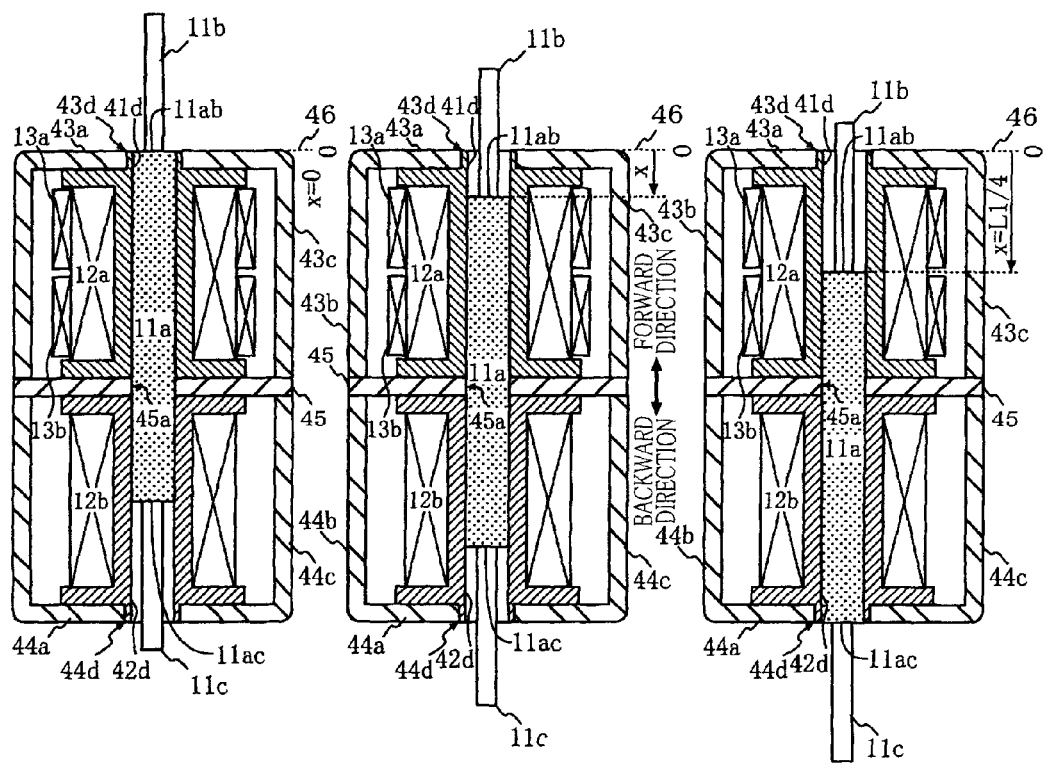
FIGS. 3A-3C are views for explaining operations of the electromagnetic actuator shown in FIG. 2.

FIGS. 3A-3C are views for explaining operations of the electromagnetic actuator shown in FIG. 2. Though the electromagnetic actuator shown in FIG. 2 is illustrated in the vertical orientation in each of FIGS. 3A-3C, the following description will be made disregarding gravity.

In the state shown in FIG. 3A, the end face 11ab of the movable core 11a is substantially flush with the outer surface of the end face 43a of the yoke 43. In other words, the movable core 11a is at the top dead point at which the movable core 11a is not driven so as to further displace upwardly. In the state shown in FIG. 3C, the end face 11ac of the movable core 11a is substantially flush with the outer surface of the end face 44a of the yoke 44. In other words, the movable core 11a is at a bottom dead point at which the movable core 11a is not driven so as to further displace downwardly. In the state shown in FIG. 3B, the movable core 11a is located at a position intermediate between the top dead point and the bottom dead point.

Next, there will be explained an instance in which the PWM drive current is supplied to the forward coil 12a.

The movable core 11a is in the state shown in FIG. 3B, and the PWM drive current is supplied to the forward coil 12a, so that the movable core 11a is moved in the forward direction, i.e., in the upward direction in FIGS. 3A-3C and finally reaches the top dead point shown in FIG. 3A when the movable core 11a displaces to a maximum extent owing to force balance with the mechanical movable member 5.

When the movable core 11a is in the state shown in FIG. 3A, the end face 11ab of the movable core 11a is located at the positional origin 46. Accordingly, the movable core 11a penetrates the hollow portions of both of the main detection coil 13a and the auxiliary detection coil 13b. As a result, the mutual coupling coefficient of the forward coil 12a and the main detection coil 13a and the mutual coupling coefficient of the forward coil 12a and the auxiliary detection coil 13b are identical with each other. Accordingly, the electromotive force mutually induced in the main detection coil 13a and the electromotive force mutually induced in the auxiliary detection coil 13b are substantially equal to each other.

When the end face 11ab of the movable core 11a is located at a position at which the distance x from the positional origin 46 is larger than 0 (x>0), as shown in FIG. 3B, the movable core 11a penetrates the hollow portion of the auxiliary detection coil 13b, but is retracted from a part of the hollow portion of the main detection coil 13a. As a result, the mutual coupling coefficient of the forward coil 12a and the auxiliary detection coil 13b is larger than the mutual coupling coefficient of the forward coil 12a and the main detection coil 13a.

Accordingly, the electromotive force mutually induced in the main detection coil 13a is smaller than the electromotive force mutually induced in the auxiliary detection coil 13b.

When the end face 11ac of the movable core 11a is flush with the outer surface of the end face 44a of the yoke 44 as shown in FIG. 3C, the end face 11ab of the movable core 11a is located at a position at which the distance x from the positional origin 46 is equal to L1/4 (x=L1/4).

On this occasion, the movable core 11a penetrates the hollow portion of the auxiliary detection coil 13b, but is entirely retracted from the hollow portion of the main detection coil 13a. As a result, the mutual coupling coefficient of the forward coil 12a and the main detection coil 13a is the smallest. Accordingly, the electromotive force mutually induced in the main detection coil 13a is the smallest.

Next, there will be explained an instance in which the PWM drive current is supplied to the backward coil 12b. In this instance, the states shown in FIGS. 3A-3C are also established owing to force balance between the electromagnetic actuator 1 and the mechanical movable member 5, as in the above-indicated instance in which the PWM current is supplied to the forward coil 12a. In particular, FIG. 3C shows a state in which the PWM drive current is supplied to the backward coil 12b and the movable core 11a is thereby moved in the backward direction, i.e., in the downward direction in FIG. 3C, so that the movable coil 11a is displaced in the backward direction to a maximum extent.

Where the main detection coil 13a and the auxiliary detection coil 13b are wound on the forward coil 12a as shown in FIGS. 3A-3C, the mutual coupling coefficient of the backward coil 12b and the main detection coil 13a and the mutual coupling coefficient of the backward coil 12b and the auxiliary detection coil 13b are both small for the reasons that the detection coils 13a, 13b are distant from the backward coil 12b and besides the partition yoke 45 exists between the two detection coils 13a, 13b and the backward coil 12b. Hence, as compared with the instance in which the drive current is supplied to the forward coil 12a, the electromotive force mutually induced from the backward coil 12b to the main detection coil 13a and the electromotive force mutually induced from the backward coil 12b to the auxiliary detection coil 13b are smaller.

Since the displacement position of the movable core 11a differs among the respective states shown in FIGS. 3A-3C, however, the electromotive forces mutually induced from the backward coil 12b to the main detection coil 13a and to the auxiliary detection coil 13b, respectively, vary among the respective states shown in FIGS. 3A-3C, and a difference between those electromotive forces varies among the respective states shown in FIGS. 3A-3C, as in the above-indicated instance in which the PWM current is supplied to the forward coil 12a. Therefore, it is possible to detect the displacement position of the movable core 11a.

As described above, in detecting the displacement position of the movable core 11a, the magnitude of each of the electromotive forces mutually induced in the main detection coil 13a and the auxiliary detection coil 13b, respectively, differs depending upon to which one of the forward coil 12a and the backward coil 12b the drive current is supplied. In view of this, the drive control portion 4 may be configured to output, to the drive portion 2, a signal indicative of to which one of the forward coil 12a and the backward coil 12b the drive current is to be supplied, and the drive portion 2 may be configured to supply the drive current to one of the forward and backward coils 12a, 12b on the basis of the signal. In this case, the displacement position of the movable core 11a needs to be detected on the basis of the displacement-position detection signal outputted from the displacement-position detecting portion 3 by referring to the signal, outputted by the drive control portion 4, indicative of to which one of the forward coil 12a and the backward coil 12b the drive current is supplied. In this respect, the correction portion 33 may be configured not only to correct the displacement-position detection signal on the basis of the duty ratio, but also to correct the displacement-position detection signal on the basis of the signal, inputted thereto from the drive control portion 4, indicative of to which one of the forward coil 12a and the backward coil 12b the drive current is supplied.

The displacement-position detection period may be temporarily or periodically set when the backward electromagnetic actuator $1_2$ is being driven by the PWM drive current supplied to the backward coil 12b according to the PWM signal, and the PWM drive current may be supplied also to the forward coil 12a which is on a non-driven side.

In this case, the electromotive forces mutually induced respectively in the main detection coil 13a and the auxiliary detection coil 13b of the forward electromagnetic actuator $1_1$ from each of the forward coil 12a and the backward coil 12b vary, so that the displacement position of the movable core 11a is detected.

On this occasion, the drive current is supplied to the forward coil 12a according to the same PWM signal by which the drive current is supplied to the backward coil 12b. In this case, the electromotive forces mutually induced respectively in the main detection coil 13a and the auxiliary detection coil 13b from the backward coil 12b and the electromotive forces mutually induced respectively in the main detection coil 13a and the auxiliary detection coil 13b from the forward coil 12a do not interfere with each other.

Further, the drive current may be supplied to the forward coil 12a according to a PWM signal whose duty ratio is suitable for detecting the displacement position or is small enough not to influence the drive control, as explained above with reference to FIG. 1.

The main detection coil 13a and the auxiliary detection coil 13b may be provided in each of the forward and backward electromagnetic actuators $1_1$, $1_2$.

Where the forward electromagnetic actuator $1_1$ is driven in this arrangement, the displacement-position detecting portion 3 outputs the displacement-position detection signal on the basis of the output voltage, inputted thereto, of the main detection coil 13a and the auxiliary detection coil 13b of the forward electromagnetic actuator $1_1$ that are connected in anti-series. On the other hand, where the backward electromagnetic actuator $1_2$ is driven, the displacement-position detecting portion 3 outputs the displacement-position detection signal on the basis of the output voltage, inputted thereto, of the main detection coil and the auxiliary detection coil (both not shown) of the backward electromagnetic actuator $1_2$ that are connected in anti-series.

Further, the output voltage of the main detection coil 13a and the auxiliary detection coil 13b of the forward electromagnetic actuator $1_1$ that are connected in anti-series and the output voltage of the main detection coil and the auxiliary detection coil of the backward electromagnetic actuator $1_2$ that are connected in anti-series may be separately inputted to the displacement-position detecting portion 3, and the displacement-position detecting portion 3 may obtain separate displacement-position detection signals and may output an average value of the separately obtained displacement-position detection signals.

When one of the forward and backward electromagnetic actuators $1_1$, $1_2$ (e.g., the forward electromagnetic actuator $1_1$) is being driven, the displacement-position detection period may be temporarily or periodically set and the PWM drive current may be supplied also to the drive coil (the backward coil 12b) of the other of the two electromagnetic actuators (e.g., the backward electromagnetic actuator $1_2$) which is on the non-driven side.

On this occasion, the drive current is supplied to the drive coil (the backward coil 12b) of the other of the two electromagnetic actuators (the backward electromagnetic actuator $1_2$) according to the same PWM signal by which the drive current is supplied to the drive coil (the forward coil 12a) of the one of the two electromagnetic actuators (the forward electromagnetic actuator $1_1$). Further, the drive current may be supplied to the drive coil (the backward coil 12b) of the other of the two electromagnetic actuators (the backward electromagnetic actuator $1_2$) according to a PWM signal whose duty ratio is suitable for detection of the displacement position or is small enough not to influence the drive control.

In the arrangement described above, the output voltage of the main detection coil 13a and the auxiliary detection coil 13b of the one of the two electromagnetic actuators (the forward electromagnetic actuator $1_1$) that are connected in anti-series and the output voltage of the main detection coil and the auxiliary detection coil of the other of the two electromagnetic actuators (the backward electromagnetic actuator $1_2$) that are connected in anti-series are separately inputted to the displacement-position detecting portion 3, and the displacement-position detecting portion 3 obtains separate displacement-position detection signals and outputs an average value of the separately obtained displacement-position detection signals.

Figure 4A:
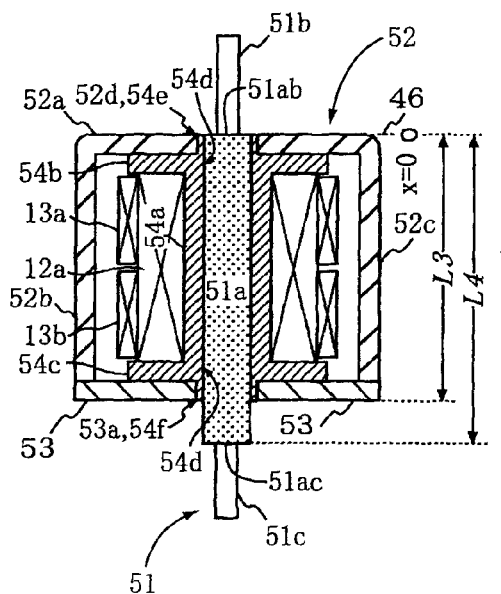
FIGS. 4A-4C are structural views respectively showing a second specific example, a third specific example, and a fourth specific example, of the electromagnetic actuator shown in FIG. 1.
Figure 4B:
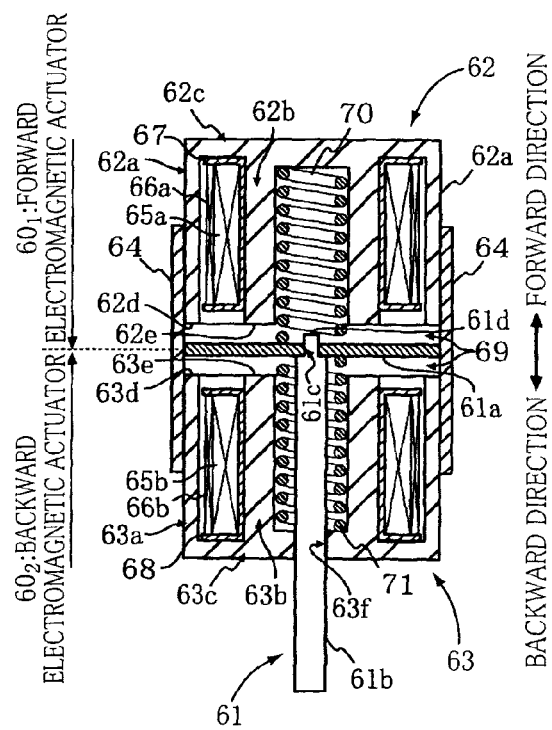
Figure 4C:
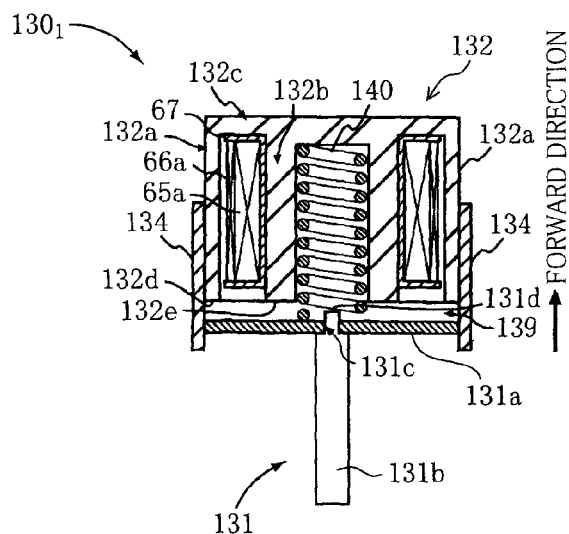

FIGS. 4A, 4B, and 4C are structural views respectively showing a second specific example, a third specific example, and a fourth specific example, of the electromagnetic actuator 1 of FIG. 1.

FIG. 4A shows an electromagnetic actuator of a solenoid type and of a one-way driving type. The same reference signs as used in FIG. 2 are used in FIG. 4A to identify the corresponding components. A direction of a drive force generated in the electromagnetic actuator shown in FIG. 4A is referred to as a forward direction which corresponds to the upward direction in FIG. 4A.

In the second specific example of FIG. 4A, a plunger 51 includes: a movable core 51a formed of a magnetic material; and a first drive shaft 51b and a second drive shaft 51c which protrude from respective opposite end faces 51ab and 51ac of the movable core 51a in a displacement direction thereof and which have a diameter smaller than that of the movable core 51a. The plunger 51 linearly displaces along the longitudinal direction of the movable core 51a. At least one of the first drive shaft 51b and the second drive shaft 51c transmits a drive force to the mechanical system. Only one of the first and second drive shafts 51b, 51c may be provided.

The forward coil 12a is wound around a bobbin 54. While the bobbin 54 is similar to the bobbin 41 shown in FIG. 2, the bobbin 54 has an axial hole 54d and annular stepped portions 54e, 54f which are respectively formed at flange portions 54b, 54c.

As in FIG. 2, the main detection coil 13a and the auxiliary detection coil 13b are wound around the forward coil 12a so as to be superposed on the outer circumference of the forward coil 12a. The main detection coil 13a is wound around a portion of the forward coil 12a nearer to the positional origin 46 while the auxiliary detection coil 13b is wound around a portion of the forward coil 12a remote from the positional origin 46.

A yoke 52 is formed by bending, at right angles, a rectangular flat plate made of a magnetic material, such that two side portions 52*b* and 52*c* are formed on respective opposite ends of an end face 52*a*. A yoke 53 is a rectangular flat plate member made of a magnetic material. The side portions 52*b*, 52*c* of the yoke 52 and opposite ends of the yoke 53 are fixedly coupled to each other. The yoke 53 also provides an end face. Bobbin insertion holes 52*d*, 53*a* are formed at respective centers of the end face 52*a* and the yoke 53.

The yokes 52, 53 are disposed outside the forward coil 12*a*, the main detection coil 13*a*, and the auxiliary detection coil 13*b*. The annular stepped portions 54*e*, 54*f* are respectively fitted in the bobbin insertion holes 52*d*, 53*a* of the respective yokes 52, 53. It is noted that the yokes 52, 53 are not essential elements.

The movable core 51*a* is accommodated in the forward coil 12*a*, the main detection coil 13*a*, and the auxiliary detection coil 13*b*, more specifically, in the axial hole 54*d* of the bobbin 54, so as to be linearly displaceable. The first drive shaft 51*b* protrudes from the axial hole 54*d* of the bobbin 54, so that the bobbin insertion hole 52*d* defines an opening through which the first drive shaft 51*b* displaceably protrudes from the yoke 52.

The movable core 51*a* protrudes from the annular stepped portion 54*f* of the bobbin 54, so that the bobbin insertion hole 53*a* defines an opening through which the movable core 51*a* displaceably protrudes from the yoke 53.

Here, a distance between an outer surface of the end dace 52*a* and an outer surface of the end face 53 is expressed as "L3" and the length of the movable core 51*a* is expressed as "L4". Where L3 is equal to or smaller than L4 (L3≤L4), the movable core 51 can be driven in the forward direction, i.e., the upward direction in FIG. 4A. Where a distance from the outer surface of the end face 52*a*, i.e., from the positional origin 46, to the end face 51*ab* of the movable core 51*a* is expressed as "x", the displacement position of the movable core 51*a* is detectable roughly within a range of 0≤x<(L3/2).

FIG. 4B shows a third specific example of an electromagnetic actuator of a two-way driving type which utilizes a plate-like core.

In the electromagnetic actuator shown in FIG. 4B, a single movable core 61*a* is commonly used as a movable core of each of a forward electromagnetic actuator 60$_1$ and a backward electromagnetic core 60$_2$, and the two electromagnetic actuator 60$_1$, 60$_2$ are disposed so as to be arranged along a displacement direction of the single movable core 61*a*. The forward electromagnetic actuator 60$_1$ is configured to drive the movable core 61*a* in a forward direction, i.e., in the upward direction in FIG. 4B while the backward electromagnetic core 60$_2$ is configured to drive the movable core 61*a* in a backward direction, i.e., in the downward direction in FIG. 4B. Here, the forward direction is defined as a direction of a drive force generated in the forward electromagnetic actuator 60$_1$ while the backward direction is defined as a direction of a drive force generated in the backward electromagnetic core 60$_2$. A first detection coil 66*a* is provided in the forward electromagnetic actuator 60$_1$ while a second detection coil 66*b* is provided in the backward electromagnetic core 60$_2$. Where the detection of the displacement position is unnecessary in driving in one of the forward direction and the backward direction, a corresponding one of the first coil 66*a* and the second coil 66*b* is unnecessary.

In the forward electromagnetic actuator 60$_1$, a stationary core 62 formed of a magnetic material is constituted such that one end of an outer stationary core 62*a* and one end of an inner stationary core 62*b* are connected by a connecting stationary core 62*c*, thereby forming, between the outer stationary core 62*a* and the inner stationary core 62*b*, a recess whose bottom is defined by the connecting stationary core 62*c*. In the recess, the drive coil (i.e., a forward coil 65*a*) and the detection coil (i.e., the first detection coil 66*a*) are accommodated. Similarly, in the backward electromagnetic actuator 60$_2$, a stationary core 63 formed of a magnetic material is constituted such that one end of an outer stationary core 63*a* and one end of an inner stationary core 63*b* are connected by a connecting stationary core 63*c*, thereby forming, between the outer stationary core 63*a* and the inner stationary core 63*b*, a recess whose bottom is defined by the connecting stationary core 63*c*. In the recess, the drive coil (a backward coil 65*b*) and the detection coil (i.e., the second detection coil 66*b*) are accommodated.

In the illustrated example, each of the outer stationary core 62*a* and the inner stationary core 62*b* has a hollow cylindrical shape, and the connecting stationary core 62*c* has a disk-like shape. An opening portion of the recess of the stationary core 62 is formed between an end face 62*d* of the outer stationary core 62*a* and an end face 62*e* of the inner stationary core 62*b* while an opening portion of the recess of the stationary core 63 is formed between an end face 63*d* of the outer stationary core 63*a* and an end face 63*e* of the inner stationary core 63*b*.

A plunger 61 includes the movable core 61*a* and a drive shaft 61*b*. The movable core 61*a* is a plate-like body formed of a magnetic material. While the movable core 61*a* in the example of FIG. 4B has a flat disk-like shape, the movable core 61*a* may be uneven in its thickness, like the armature described in the above-indicated Patent Literature 4.

The movable core 61*a* is disposed outside the stationary cores 62, 63. The movable core 61*a* is disposed with respect to each of the opening portions of the recesses of the respective stationary cores 62, 63 so as to have a spacing whose size changes in accordance with the displacement of the movable core 61*a*, whereby the movable core 61*a* is linearly displaceable along an axial direction perpendicular to the plane of the movable core 61*a*, and the movable core 61*a* substantially separates the forward electromagnetic actuator 60$_1$ and the backward electromagnetic actuator 60$_2$ magnetically.

The drive shaft 61*b* protrudes from at least one surface of the movable core 61*a* so as to extend in the axial direction perpendicular to the plane of the movable core 61*a*. In the example of FIG. 4B, a top end portion 61*d* of the drive shaft 61*b* is inserted into a center hole 61*c* formed at the center of the movable core 61*a* and is fixed to the movable core 61*a* by fitting, welding or the like.

In the backward electromagnetic actuator 60$_2$, a plunger insertion hole 63*f* is formed at the center of the connecting stationary core 63*c*.

The movable core 61*a* linearly displaces, whereby the drive shaft 61*b* transmits a drive force to the mechanical system. In the state shown in FIG. 4B, the displacement position of the movable core 61*a* is at an intermediate point.

The forward coil 65*a* and the backward coil 65*b* are wound around respective bobbins 67, 68, and the first detection coil 66*a* and the second detection coil 66*b* are wound around on the respective forward coil 65*a* and backward coil 65*b* so as to be superposed thereon. The bobbins 67, 68 are respectively fitted on outer circumferential surfaces of the respective inner stationary cores 62*b*, 63*b*, such that the inner stationary cores 62*b*, 63*b* are respectively fitted in axial holes of the respective bobbins 67, 68.

The stationary cores 62, 63 are disposed such that the respective connecting stationary cores 62*c*, 63*c* are located remote from the movable core 61*a* and such that open end faces of the respective outer stationary cores 62*a*, 63*a* are opposed to each other while open end faces of the respective inner stationary cores 62*b*, 63*b* are opposed to each other, thereby defining an inner space 69.

The stationary cores 62, 63 are fixedly coupled by a hollow cylindrical yoke 64 formed of a magnetic material such that the axes of the respective stationary cores 62, 63 are aligned with each other. Thus, the stationary cores 62, 63 are integrated with each other. The yoke 64 is provided for integrating the forward electromagnetic actuator $60_1$ and the backward electromagnetic actuator $60_2$ and for intensifying the drive force to be given to the movable core 61a, and is not an essential component.

Owing to the presence of the outer stationary cores 62a, 63a, the inner stationary cores 62b, 63b, and the connecting stationary cores 62c, 63c described above, the magnetic resistance of each magnetic circuit passing through the movable core 61a is made small, whereby the drive force of each electromagnetic actuator $60_1$, $60_2$ increases.

Further, a hollow portion is provided in each inner stationary core 62b, 63b, and a mechanical element such as a coil spring can be inserted in the hollow portion as described below.

By increasing the area of the movable core 61a in the form of the plate and by decreasing the length of each drive coil 65a, 65b while increasing the number of layers thereof, the height of each electromagnetic actuator $60_1$, $60_2$ as installed can be easily made small without decreasing the number of turns of the drive coil 65a, 65b.

When the stationary cores 62, 63 are integrated, a coil spring 70 is accommodated in an axial hole of the inner stationary core 62b while a coil spring 71 is accommodated in an axial hole of the inner stationary core 63b. Owing to the coil springs 70, 71, the movable core 61a is movably supported in a balanced biased state.

The drive shaft 61b protrudes outwardly from the plunger insertion hole 63f of the stationary core 63. The movable core 61a is designed such that the periphery of the movable core 61a is opposed to an inner circumferential surface of the yoke 64 with a slight clearance interposed therebetween or is held in sliding contact with the inner circumferential surface of the yoke 64.

While not shown, there is formed at least one air hole through which the air flows between the inner space 69 and the exterior. For instance, the air hole is formed at a suitable position of the stationary core 62, the stationary core 63, and/or the yoke 64. The plunger insertion hole 63f can function as an air hole.

When the electromagnetic actuator works as the forward electromagnetic actuator $60_1$, the PWM current is supplied to the forward coil 65a, and there is generated a drive force in the forward direction to cause the movable core 61a to be attracted to the end faces 62d, 62e of the stationary core 62. On this occasion, the closer the movable core 61a moves toward the end faces 62d, 62e, the larger the mutual coupling coefficient of the forward coil 65a and the first detection coil 66a becomes. Accordingly, the electromotive force mutually induced in the first detection coil 66a becomes large.

On the other hand, when the electromagnetic actuator works as the backward electromagnetic actuator $60_2$, the PWM current is supplied to the backward coil 65b, and there is generated a drive force in the backward direction to cause the movable core 61a to be attracted to the end faces 63d, 63e of the stationary core 63. On this occasion, the closer the movable core 61a moves toward the end faces 63d, 63e, the larger the mutual coupling coefficient of the backward coil 65b and the second detection coil 66b becomes. Accordingly, the electromotive force mutually induced in the second detection coil 66b becomes large.

The displacement position of the movable core 61a is determined by a balance between the drive force by the electromagnetic force and a force of the mechanical movable member 5 including the biasing force of the coil springs 70, 71.

In the above explanation, the first detection coil 66a is used as the detection coil 13 when the electromagnetic actuator works as the forward electromagnetic actuator $60_1$ while the second detection coil 66b is used as the detection coil 13 when the electromagnetic actuator works as the backward electromagnetic actuator $60_2$.

Instead, the displacement-position detection period may be temporarily or periodically set when one of the forward and backward electromagnetic actuators $60_1$, $60_2$ (e.g., the forward electromagnetic actuator $60_1$) is being driven, and the PWM drive current may be supplied also to the drive coil (the backward coil 65b) of the other of the two electromagnetic actuators (the backward electromagnetic actuator $60_2$) which is on the non-driven side.

On this occasion, the drive current is supplied to the drive coil (the backward coil 65b) of the other of the two electromagnetic actuators (the backward electromagnetic actuator $60_2$) according to the same PWM signal by which the drive current is supplied to the drive coil (the forward coil 65a) of the one of the two electromagnetic actuators (the forward electromagnetic actuator $60_1$). Alternatively, the drive current may be supplied to the drive coil (the backward coil 65b) of the other of the two electromagnetic actuators (e.g., the backward electromagnetic actuator $60_2$) according to a PWM signal whose duty ratio is suitable for detection of the displacement position or is small enough not to influence the drive control.

In the arrangement described above, the output voltage of the detection coil 66a of the one of the two electromagnetic actuators (the forward electromagnetic actuator $60_1$) and the output voltage of the detection coil 66b of the other of the two electromagnetic actuators (the backward electromagnetic actuator $60_2$) are separately inputted to the displacement-position detecting portion 3, and the displacement-position detecting portion 3 obtains separate displacement-position detection signals and outputs an average value of the separately obtained displacement-position detection signals.

In an instance in which only one of the first and second detection coils 66a, 66b is present, the PWM drive current similar to that described above is supplied, in the displacement-position detection period, to the electromagnetic actuator not having the detection coil in a state in which the electromagnetic actuator is not being driven, whereby the displacement position can be detected.

Where the drive current is supplied, in the displacement-position detection period indicated above, to the drive coil (the backward coil 65b) of the other of the two electromagnetic actuators (the backward electromagnetic actuator $60_2$) according to the same PWM signal by which the drive current is supplied to the drive coil (the forward coil 65a) of the one of the two electromagnetic actuators (the forward electromagnetic actuator $60_1$), differential detection is possible by utilizing, as the detection coil 13 shown in FIG. 1, the first detection coil 66a and the second detection coil 66b that are connected in anti-series such that the polarity of the mutual coupling coefficient of the first detection coil 66a and the forward coil 65a and the mutual coupling coefficient of the second detection coil 66b and the backward coil 65b are opposite to each other.

As a result, the voltage component contained in the output of the first detection coil 66a which does not depend on the displacement position of the movable core 61a and the voltage component contained in the output of the second detection coil 66b which does not depend on the displacement position of the movable core 61a are cancelled with each other. Further, where ringing and external noise are contained commonly in the first detection coil 66a and the second detection coil 66b, the ringing and the external noise are similarly cancelled. The technique described above is applicable to the electromagnetic actuator shown in FIG. 2. In this case, one detection coil 13a may be provided in each of the forward electromagnetic actuator $1_1$ and the backward electromagnetic actuator $1_2$, and a coil corresponding to the auxiliary detection coil 13b is not necessary.

In the illustrated third specific example of FIG. 4B, the stationary cores 62, 63 are formed of the magnetic material. At least one of the stationary cores 62, 63 may be formed of a resin such as a plastic (i.e., nonmagnetic material). While the yoke 64 having the hollow cylindrical shape is formed of the magnetic material in the illustrated third specific example, the yoke 64 may be formed of a resin such as a plastic (i.e., nonmagnetic material). Further, the drive shaft 61b may be formed of a magnetic material or a resin such as a plastic (i.e., nonmagnetic material).

FIG. 4C shows a fourth specific example of an electromagnetic actuator of a one-way driving type which utilizes a plate-like core. In FIG. 4C, the same reference signs as used in FIG. 4B are used to identify the corresponding components. A direction of a drive force generated by the electromagnetic actuator shown in FIG. 4C is defined as a forward direction which corresponds to the upward direction in FIG. 4C.

In a forward electromagnetic actuator $130_1$ shown in FIG. 4C, a stationary core 132 formed of a magnetic material is constituted such that one end of an outer stationary core 132a and one end of an inner stationary core 132b are connected by a connecting stationary core 132c, thereby forming, between the outer stationary core 132a and the inner stationary core 132b, a recess whose bottom is defined by the connecting stationary core 132c. In the recess, the drive coil (i.e., the forward coil 65a) and the detection coil (the first detection coil 66a) are accommodated.

In the illustrated example, each of the outer stationary core 132a and the inner stationary core 132b has a hollow cylindrical shape, and the connecting stationary core 132c has a disk-like shape. An opening portion of the recess of the stationary core 132 is formed between an end face 132d of the outer stationary core 132a and an end face 132e of the inner stationary core 132b.

A plunger 131 includes a movable core 131a and a drive shaft 131b. The movable core 131a is a plate-like body formed of a magnetic material. While the movable core 131a in the example of FIG. 4C has a flat disk-like shape, the movable core 131a may be uneven in its thickness, like the armature described in the above-indicated Patent Literature 4.

The movable core 131a is disposed outside the stationary core 132, namely, disposed at a position where the movable core 131a is not accommodated in the recess of the stationary core 132. The movable core 131a is disposed with respect to the opening portion of the recess of the stationary core 132 so as to have a spacing whose size changes in accordance with the displacement of the movable core 131a, whereby the movable core 131a is linearly displaceable along an axial direction perpendicular to the plane thereof.

The drive shaft 131b protrudes from at least one surface of the movable core 131a so as to extend in the axial direction perpendicular to the plane of the movable core 131a. In the illustrated example, a top end portion 131d of the drive shaft 131b is inserted into a center hole 131c formed at the center of the movable core 131a and is fixed to the movable core 131a by fitting, welding or the like.

The stationary core 132 is fixedly coupled to a guide member 134 formed of a magnetic material and having a hollow cylindrical shape, so that the stationary core 132 and the guide member 134 are integrated with each other. As described below, the guide member 134 is provided for guiding a movement of the movable core 131a in the up-down direction in FIG. 4C, i.e., in the axial direction perpendicular to the plane of the movable core 131a, and for intensifying the drive force to be given to the movable core 131a. Accordingly, the guide member 134 is not an essential component.

When the stationary core 132 and the guide member 134 are integrated, a coil spring 140 is accommodated in an axial hole of the inner stationary core 132b. Owing to the coil spring 140, the movable core 131a is movably supported in a balanced biased state.

The movable core 131a is designed such that the periphery of the movable core 131a is opposed to an inner circumferential surface of the guide member 134 with a slight clearance interposed therebetween or is held in sliding contact with the inner circumferential surface of the guide member 134. The movable core 131a is disposed so as to be opposed to the opening portion of the recess of the stationary core 132, thereby defining an inner space 139 between the end faces 132d, 132e and the movable core 131a.

When the forward actuator $130_1$ is operated, the PWM current is supplied to the forward coil 65a and there is generated a drive force in the forward direction to cause the movable core 131a to be attracted to the end faces 132d, 132e. On this occasion, the closer the movable core 131a moves toward the end faces 132d, 132e, the larger the mutual coupling coefficient of the forward coil 65a and the first detection coil 66a becomes. Accordingly, the electromotive force mutually induced in the first detection coil 66a becomes large.

The displacement position of the movable core 131a is determined by a balance between the drive force by the electromagnetic force and a force of the mechanical movable member 5 including the biasing force of the coil spring 140.

In the illustrated fourth specific example, the guide member 134 is formed of the magnetic material. The guide member 134 may be formed of a resin such as a plastic (i.e., nonmagnetic material). Further, the guide member 134 may be formed integrally with the movable core 131a.

The forward actuator $130_1$ may be configured not to have the coil spring 140. In this instance, the movable core 131a moves downward in FIG. 4C by the self weights of the drive shaft 131b and the mechanical movable member 5 after the drive current to cause the drive force in the forward direction has been made zero.

FIG. 5A is a circuit diagram showing a specific example of the sampling-signal generating circuit 31 and the synchronous sampling circuit 32. The electromagnetic actuator of FIG. 2 is used.

FIG. 6 is a waveform diagrams showing waveforms of signals respectively outputted from various portions in the circuits of FIG. 5. Initially, the drive portion is explained. The output of the PWM-signal generating circuit 21 is a rectangular wave, and FIG. 6(a) shows a signal waveform in which the duty ratio (b/a) is 20%. The output of the PWM-signal generating circuit 21 is supplied to one of the two drive circuits 22a, 22b via a selecting portion 81 configured to select forward driving or backward driving. As each of the drive circuits 22a, 22b, an FET switching circuit of an H-bridge type is used, for instance. In this case, the output of the PWM-signal generating circuit 21 becomes an FET gate voltage of each of the drive circuits 22a, 22b. Accordingly, each of the drive circuits 22a, 22b functions as an amplifier circuit in which the output of the PWM-signal generating circuit 21 is used as the FET gate voltage. The drive circuit 22a is connected to the forward coil 12a while the drive circuit 22b is connected to the backward coil 12b, and each of the drive circuits 22a, 22b generates a rectangular wave for generating a power sufficient to drive an object to be driven such as the performance operating element or the valve of the internal combustion engine.

Next, a specific example of the sampling-signal generating circuit 31 is explained. The PWM signal outputted from the PWM-signal generating circuit 21 is supplied to inverters 82, 83 and the level of the PWM signal is inverted as shown in FIG. 6(b). The output of the inverter 82 is supplied to a first time-constant circuit constituted by a resistor 85, a diode 86, and a capacitor 87 and is outputted to an inverter 88 in a charge and discharge waveform shown in FIG. 6(c). Similarly, the output of the inverter 83 is supplied to a second time-constant circuit constituted by a resistor 89, a diode 90, and a capacitor 91 and is outputted to an inverter 92 in a charge and discharge waveform shown in FIG. 6(d). In the illustrated example, the time constant of the first time-constant circuit is larger than that of the second time-constant circuit.

When the output of the inverter 88 shown in FIG. 6(e) and the output of the inverter 92 shown in FIG. 6(f) are compared, the latter is somewhat delayed with respect to a falling edge of the rectangular wave of the PWM signal shown in FIG. 6(a). An EXOR circuit 93 takes an exclusive OR of the output of the inverter 88 and the output of the inverter 92. The output of the EXOR circuit 93 is outputted to the synchronous sampling circuit 32 via a resistor 94 and is also grounded via a capacitor 95. The inverter 82 and the inverter 88 may be directly connected to each other by eliminating the first time-constant circuit.

In the output of the EXOR circuit 93, there is generated a short rectangular pulse at each falling edge (down edge) of the PWM signal, as shown in FIG. 6(g). This short rectangular pulse is a sampling signal that determines a sampling point.

Next, the synchronous sampling circuit 32 is explained.

The main detection coil 13a and the auxiliary detection coil 13b of the electromagnetic actuator 1 are connected in reverse-polarity series such that the winding directions of the respective detection coils 13a, 13b are opposite to each other. The thus connected detection coils 13a, 13b correspond to the detection coil 13 shown in FIG. 1, and the output voltage of the main detection coil 13a and the output voltage of the auxiliary detection coil 13b are outputted to the synchronous sampling circuit 32. In FIGS. 5A-5C, a terminal of each coil where the winding starts is indicated by a black dot. FIG. 5B schematically shows winding wires of the respective forward coil 12a and backward coil 12b and the connection state thereof, together with the periphery of the coils 12a, 12b. That is, the forward coil 12a and the backward coil 12b are disposed in the same polarity in which the winding directions of the respective forward and backward coils 12, 12b are the same. One end of the forward coil 12a is connected to the drive circuit 22a while the other end thereof is grounded. One end of the backward coil 12b is connected to the drive circuit 22b while the other end thereof is grounded. Further, a winding wire of the main detection coil 13a and the auxiliary detection coil 13b and the connection state thereof are schematically shown in FIG. 5C. As shown in FIG. 5C, the main detection coil 13a and the auxiliary detection coil 13b are connected to each other in reverse-polarity series such that the respective winding directions are opposite. As shown in FIGS. 6(h) and 6(i), each of the output voltages of the respective main detection coil 13a and auxiliary detection coil 13b is a rectangular wave which is synchronized with the PWM signal shown in FIG. 6(a). A ringing waveform is superimposed before and after the rising and the falling of the rectangular wave, and noise not shown is superimposed as a whole. Each of the output voltages of the respective main detection coil 13a and auxiliary detection coil 13b may be considered as a voltage generated between opposite ends thereof.

Where the H-bridge type FET switching circuit is used as the drive circuit 22, the electric current starts to flow with a slight delay from timing at which the FET gate voltage changes to on, and the electric current is shut off with a slight delay from timing at which the FET gate voltage changes on to off, partly because the circuit includes some inductance elements.

As a result, the output voltages of the respective main detection coil 13a and the auxiliary detection coil 13b are also delayed in accordance with the above-indicated delay of the output current. Accordingly, a period during which the sampling signal is kept at a high level is included within a period during which the drive circuit 22a is kept in the on state, as shown in FIG. 6(g).

FIG. 6(j) shows an output voltage of the main detection coil 13a and the auxiliary detection coil 13b that are connected in reverse-polarity series, and the output voltage is represented as a differential voltage between the output voltage of the main detection coil 13a shown in FIG. 6(h) and the output voltage of the auxiliary detection coil 13b shown in FIG. 6(i). As shown in FIG. 6(j), the output voltage abruptly falls after an impulse in a positive direction has been once generated at rise timing of the output voltages of the respective main detection coil 13a and auxiliary detection coil 13b shown in FIGS. 6(h) and 6(i) and gradually becomes closer to a constant value. Further, the output voltage abruptly rises at the next fall timing of the output voltages of the respective detection coils 13a, 13b and gradually becomes closer to a constant value. The voltage of the waveform shown in FIG. 6(j) is about 500 mV at the maximum, and is smaller than the output voltages (both about 5 V) of the respective main detection coil 13a and auxiliary detection coil 13b shown in FIGS. 6(h) and 6(i).

The output voltage shown in FIG. 6(j) is inputted to an inverting input terminal of an operational amplifier 101 via a serial circuit constituted by a capacitor 96 and a resistor 97. On the other hand, there is inputted, to a non-inverting terminal of the operational amplifier 101, a voltage which is obtained such that a power-source voltage is divided by resistors 98, 99. It is noted that a large-capacitance capacitor 100 is connected in parallel with the resistor 99. A negative feedback resistance 102 is connected between an output terminal and the non-inverting input terminal of the operational amplifier 101, whereby the operational amplifier 101 functions as an AC coupled inverting amplifier capable of adjusting an offset voltage. The output of the operational amplifier 101 is outputted to an analog gate circuit 104 via a voltage follower 103.

FIG. 6(k) shows a differential output of the operational amplifier 101, namely, an output voltage of the voltage follower 103, which is inversely amplified by adding an offset voltage to the output voltage shown in FIG. 6(j). However, the output voltage shown in FIG. 6(k) and the output voltage shown in FIG. 6(j) qualitatively coincide with each other.

The output voltage shown in FIG. 6(k) is inputted to the analog circuit 104. Further, a gate width signal from the sampling-signal generating circuit 31 is inputted to a gate terminal of the analog circuit 104, and the analog circuit 104 samples the voltage from the voltage follower 103 for a time period corresponding to the width of the gate width signal. That is, the output voltage shown in FIG. 6(k) is synchronously sampled at each sampling point shown in FIG. 6(k) by each sampling signal shown in FIG. 6(g), is charged in a capacitor 105, is kept at a level indicated by the dash-dot line in FIG. 6(k), and is held until the next sampling point. Then the output voltage is again synchronously sampled at the next sampling point and is sample-held. The output voltage of the capacitor 105 is outputted via a voltage follower 106.

As explained above, the fall timing of each of the output voltages of the main detection coil 13a and the auxiliary detection coil 13b is delayed from the fall timing of the PWM signal shown in FIG. 6(a). Accordingly, the high-level period of the sampling signal shown in FIG. 6(g) can be conformed to the last part of the on-state period of the drive circuit 22.

In the above arrangement, the sampling-signal generating circuit 31 utilizes the operation delay of the drive circuit 22. However, the technique of generating the sampling signal is not limited to the illustrated technique.

For instance, there may be used a circuit configured to generate a short-cycle single-shot pulse when a predetermined delay time elapses after the rise timing of the PWM signal shown in FIG. 6(a), and the single-shot pulse may be utilized as the sampling signal. The predetermined delay time is controlled in accordance with the duty ratio of the PWM signal. In this instance, the operation delay of the drive circuit 22 is taken into consideration when the predetermined delay time is set.

Alternatively, level-change start timing (i.e., timing which corresponds to the rising of the PWM signal) of the output voltage of the detection coil (i.e., the output voltage of the main and auxiliary detection coils 13a 13b that are connected in reverse-polarity series) may be detected, and timing at which a predetermined delay time has elapsed from the level-change start timing may be utilized as the sampling point.

The output of the voltage follower 106 described above is the displacement-position detection signal outputted by the synchronous sampling circuit 32. This displacement-position detection signal is an analog signal and is outputted to the correction portion 33 shown in FIG. 1 after having been converted into a digital value by an A/D converter. The digital value outputted from the A/D converter may be easily corrected in the correction portion 33 shown in FIG. 1 using correction tables or arithmetic expressions.

Where the correction portion 33 performs correcting processing on the analog signal, the displacement-position detection signal outputted by the correction portion 33 may be analog-to-digital (A/D) converted.

The sample-hold function of the analog gate circuit 104 and the capacitor 105 described above may be realized by an A/D converter, thereby permitting the synchronous sampling circuit 32 to output a digital value.

In this instance, the output of the sampling-signal generating circuit 31 may be utilized as sampling timing of the A/D converter. Alternatively, the output of the voltage follower 103 may be sampled by a high-speed sampling clock, like ordinary A/D conversion, and a digital value at timing of the sampling signal generated from the sampling-signal generating circuit 31 may be extracted from the A/D converted digital output sequence.

FIG. 7 shows a relationship between the waveform (FIG. 6(j)) of the output voltage of the main and auxiliary detection coils 13a, 13b shown in FIG. 5 that are connected in anti-series (hereinafter referred to as "output voltage waveform in anti-series connection" where appropriate) and the displacement position of the movable core 11a. It is noted that the polarity of the illustrated output voltage waveform in anti-series connection is opposite to that of the waveform shown in FIG. 6(j) but coincides with the polarity of the waveform shown in FIG. 6(k). Each voltage value in FIG. 7 is a sample value at the illustrated sampling point. The illustrated sampling point is slightly earlier than the sampling point indicated in FIG. 6(k).

The frequency and the duty ratio of the PWM signal are 15 kHz and 20%, respectively, and the length L2 of the movable core is approximately equal to 30 mm (L2≈30 mm).

FIG. 7(a) shows an output voltage waveform in anti-series connection when the displacement position of the movable core 11a is represented as x=0 mm, namely, when the movable core 11a is at the top dead point shown in FIG. 3A.

FIGS. 7(b), 7(c), and 7(d) show output voltage waveforms in anti-series connection when the displacement position of the movable core 11a is represented as x=2 mm, x=4 mm, and x=8 mm, respectively, in the state shown in FIG. 3B.

The waveform changes depending upon the displacement position of the movable core 11a. The magnitude of an instantaneous voltage at timing when the drive current changes to on shows good correspondence with the displacement position.

Accordingly, the sampling-signal generating circuit 31 shown in FIG. 1 is preferably configured to generate the sampling signal in the neighborhood of timing at which the drive current outputted by the drive circuit 22 changes from on to off. Consequently, the sampling is performed in a period in which the level of the voltage component included in the output voltage of the detection coil 13 that corresponds to the displacement is high or the level of the output voltage of the main and auxiliary detection coils 13a, 13b in anti-series connection is high and in which no ringing exists. Therefore, the signal-to-noise (S/N) ratio of the displacement-position detection signal becomes good.

Where the sampling-signal generating circuit 31 generates the sampling signal in the neighborhood of timing at which the drive current in the rectangular wave outputted by the drive circuit 22 changes from on to off, the synchronous sampling circuit 32 is capable of sampling the output value of the detection coil 13 in the neighborhood of fall timing of the output voltage in a rectangular wave. As later explained, if the timing of the sampling signal is delayed from the timing at which the drive current changes to on, the sample value rapidly lowers. In view of this, the sampling-signal generating circuit 31 is preferably configured to generate the sampling signal immediately before timing at which the drive current falls and to sample the output voltage immediately before timing at which the output voltage of the detection coil 13 falls, whereby it is possible to obtain the displacement-position detection signal from which the displacement can be accurately detected.

Where the timing of the sampling signal is earlier than the timing at which the drive current changes to off, the sample value does not substantially change. It should be noted, however, that the sample value rapidly lowers where the timing of the sampling signal is delayed from the timing at which the drive current changes to off.

The instantaneous voltage in the neighborhood of timing at which the drive current changes from off to on in the on-period of the drive current does not have good correspondence with the displacement position, but is unlikely to be changed by the duty ratio of the PWM signal.

Accordingly, the sampling-signal generating circuit 31 is preferably configured to generate the sampling signal in the on-period of the drive current which is outputted in synchronism with the PWM signal by the drive circuit 22. In other words, the sampling-signal generating circuit 31 is preferably configured to generate the sampling signal in a period from rise timing to fall timing of the drive current in the rectangular wave outputted by the drive circuit 22, whereby the displacement-position detection signal can be outputted with high reliability.

Figure 8:
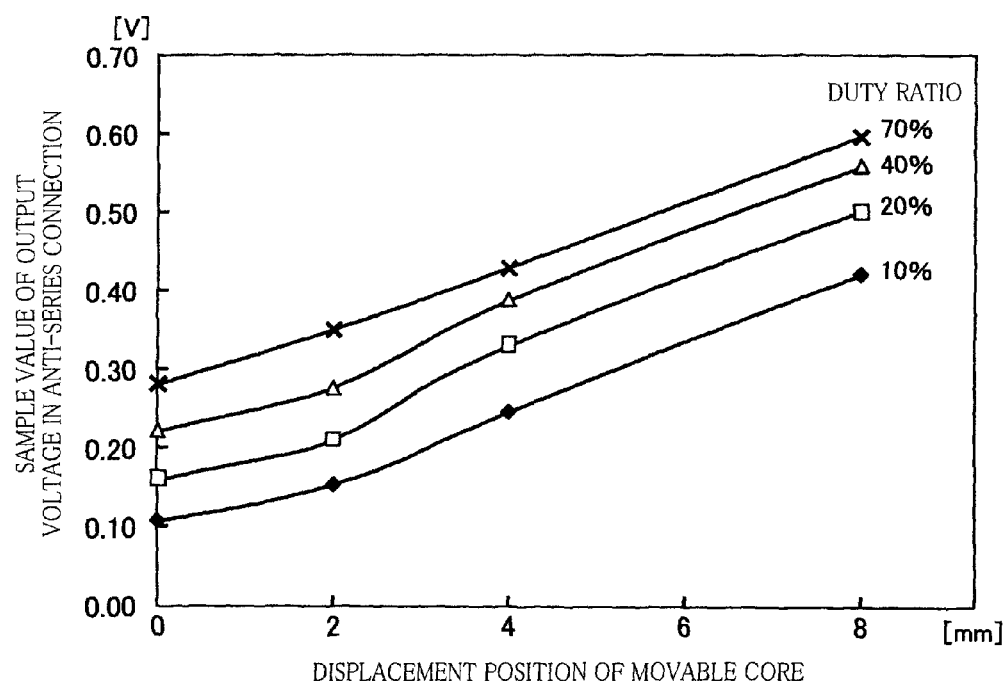
FIG. 8 is a graph showing a correspondence relationship between a sample value of the output voltage of the main detection coil and the auxiliary detection coil of FIG. 5 which are connected in anti-series; and a displacement position of the movable core.

FIG. 8 is a graph showing a correspondence relationship between the sample value of the output voltage of the main and auxiliary detection coils 13a, 13b that are connected in anti-series shown in FIG. 5 and the displacement position of the movable core 11a. The experiment conditions, the polarity of the output voltage in anti-series connection, and the sampling point are the same as those in FIG. 7.

In the graph of FIG. 8, the horizontal axis shows the displacement position x [mm] of the movable core 11a and the vertical axis shows the sample value of the output voltage in anti-series connection described above. The graph shows sample values obtained when the duty ratio (b/a) of the PWM signal is 10%, 20%, 40%, and 70%, respectively.

The displacement position x of the movable core 11a and each sample value of the output voltage waveform in anti-series connection are roughly proportional to each other, but are not strictly.

Accordingly, where the correction portion 33 shown in FIG. 1 is configured to store, in its memory, the characteristics shown in FIG. 8 in the form of correction tables or calibration tables or in the form of functions, the displacement position of the movable core 11a can be accurately detected on the basis of the sampling value of the output voltage waveform in anti-series connection.

In this instance, the larger the duty ratio (b/a) of the PWM signal becomes, the higher the output voltage becomes. Therefore, the larger duty ratio in detecting the displacement position results in improvement in the S/N ratio.

The correction portion 33 stores, in advance, the correction tables (calibration tables) or the functions corresponding to different values of the duty ratio in its memory. The correction portion 33 obtains, from the drive control portion 4 shown in FIG. 1, the value of the duty ratio or other PWM directed value that is convertible into the value of the duty ratio and selects a suitable one of the correction tables (calibration tables) corresponding to the value of the duty ratio.

In the explanation made with reference to FIGS. 2 and 5-8, the main detection coil 13a and the auxiliary detection coil 13b that are connected in anti-series are used as the detection coil 13 shown in FIG. 1.

Where only the main detection coil 13a is used instead, the synchronous sampling circuit 32 may be configured to sample a differential voltage between the output of the main detection coil 13a and a prescribed voltage (reference voltage), thereby outputting the displacement-position detection signal. The above-indicated reference voltage needs to be adjusted such that a ratio of the voltage component which is included in the differential voltage and which depends on the displacement position is made large.

The fundamental technique of detecting the displacement position of the movable core according to the present apparatus is totally different from that in the conventional technique. Accordingly, the oscillator conventionally used for detecting the displacement position and the energizing coil conventionally used for applying the output of the oscillator are not necessary in the present apparatus. In the present apparatus, a drive signal per se for driving the electromagnetic actuator also functions as the oscillator for detecting the displacement position, eliminating the high-cost sine-wave oscillator used in the conventional technique.

The displacement-position detecting portion 3 has a simple structure constituted by the sampling-signal generating circuit 31 and the synchronous sampling circuit 32. In the present apparatus, the displacement-position detection signal is detected in synchronism with the pulse width modulation signal. Accordingly, even if the waveform of the output voltage of the detection coil 13 temporally changes within one cycle of the pulse width modulation signal, the detection of the displacement position is not likely to be influenced by the temporal change.

Figure 9:
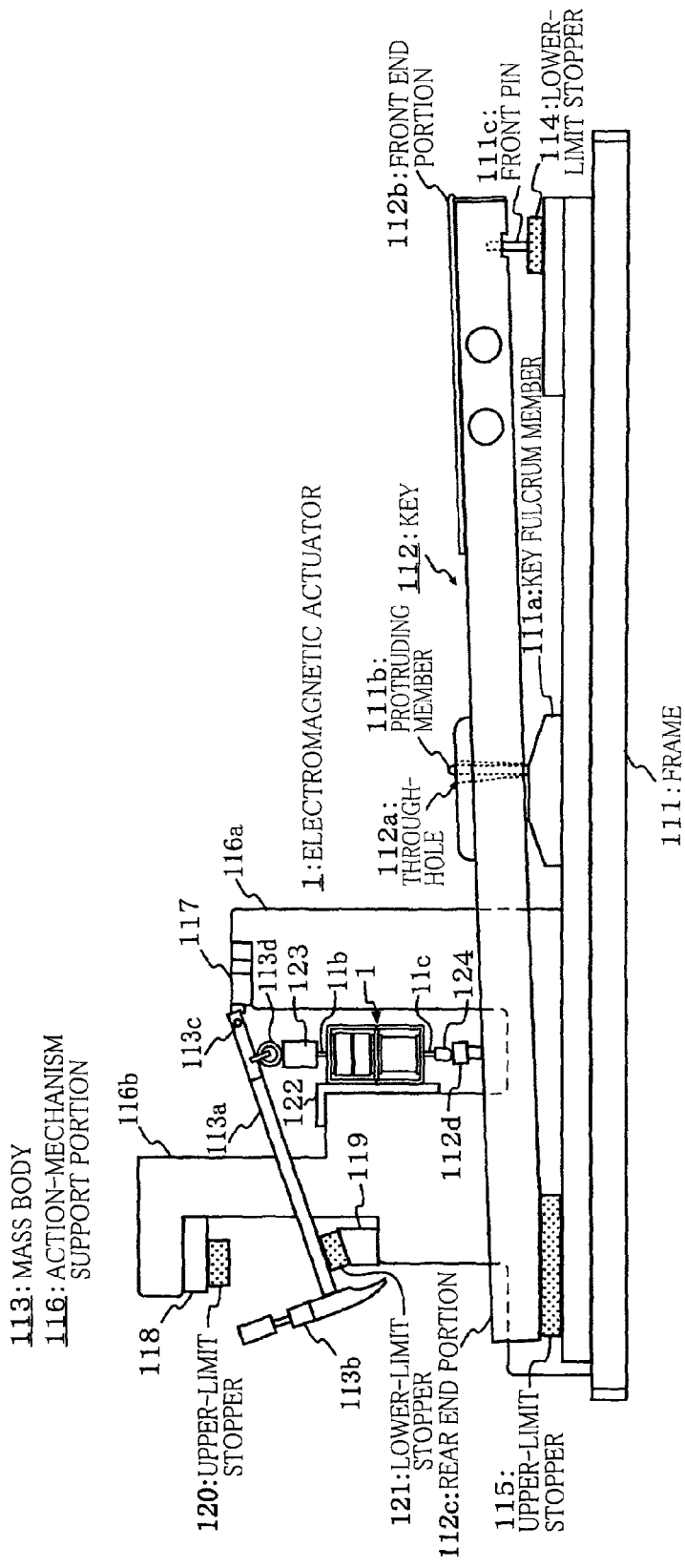
FIG. 9 is a side view of a keyboard apparatus of an electronic keyboard musical instrument equipped with a mass body in an instance where a force sense control is executed by adding the electromagnetic actuator shown in FIG. 2.

FIG. 9 is a side view of a keyboard apparatus of an electronic keyboard musical instrument equipped with a mass body, in which a force sense control is executed by applying the detecting apparatus 150 shown in FIG. 1.

While FIG. 9 shows one white key of a plurality of white and black keys which are arranged in parallel with one another, the other white and black keys have a similar structure. FIG. 9 shows the key in a state in which the key is at a non-depression position. In FIG. 9, the same reference signs as used in FIG. 2 are used to identify the corresponding components.

A key 112 and a mass body 113 are supported by a frame 111 so as to be pivotable about respective pivot centers. The mass body 113 corresponds to each key 112 and gives an associated key 112 a reaction force with respect to a key depression operation in an interlocked manner with the key 112. A key switch is not illustrated in FIG. 9.

The drive force in the backward direction generated by the electromagnetic actuator 1 is added to the key 112, and the drive force in the forward direction generated by the electromagnetic actuator 1 is added to the mass body 113, so that the force sense is controlled with respect to a depression operation and a release operation to the key 112 by a performer.

In the electromagnetic actuator 1 shown in FIG. 9, its plunger 11 (constituted by the movable core 11a, the first drive shaft 11b, and the second drive shaft 11c) is disposed so as to be interposed between the key 112 and the mass body 113, whereby the plunger 11 functions also as a transmission member for transmitting a mechanical load from one of the key 112 and the mass body 113 to the other of the key 112 and the mass body 113.

The detection coil (constituted by the main detection coil 13a and the auxiliary detection coil 13b) of the electromagnetic actuator 1 detects a displacement position of the movable core 11a, thereby detecting a stroke position of the key 112, i.e., a position of the key 112 in a key depression and release direction.

Structures of various parts will be explained.

A through-hole 112a is formed at a substantially longitudinally middle position of the key 112, and a protruding member or a pin 111b is disposed on a key fulcrum member 111a which is provided in the frame 111. The protruding member 111b is inserted through the through-hole 112a, whereby the key 112 is pivotably supported by the frame 111.

An upper end of a front pin 111c which extends upright at the front portion of the frame 111 is inserted into the bottom side of a front end portion 112b of the key 112. A lower-limit stopper 114 is disposed at the base of the front pin 111c. On the other hand, an upper-limit stopper 115 is disposed at the rear portion of the frame 111 such that the upper-limit stopper 115 comes into contact with a bottom surface of a rear end portion 112c of the key 112 when the key 112 is in a non-depression state shown in FIG. 9.

An action-mechanism support portion 116 is provided between any adjacent two of the keys so as to extend upright at the rear portion of the frame 111. A mass-body support portion 117 is provided on a front wall 116a of the action-mechanism support portion 116 while an upper-limit-stopper attachment portion 118 and a lower-limit-stopper attachment portion 119 are provided on a rear wall 116b of the action-mechanism support portion 116. An upper-limit stopper 120 and a lower-limit-stopper 121 are attached to the respective attachment portions 118, 119.

The mass body 113 has a pivot point portion 113c at one end of a shank portion 113a thereof, a mass center portion 113b at the other end, and a sliding member 113d having a roller at an intermediate portion near to the one end.

The mass body 113 is disposed right above the associated key 112 and is pivotably supported at its pivot point portion 113c by the mass-body support portion 117. The shank portion 113a pivots upward and downward, and its pivotable range is restricted by the upper-limit stopper 120 and the lower-limit stopper 121.

The electromagnetic actuator 1 is fixed to the front surface of the rear wall 116b of the action-mechanism support portion 116 via an attachment plate 122. A first head 123 having a horizontal upper surface is fixed to the first drive shaft 11b while a cap-like second head 124 having buffering and sliding action is fixed to the second drive shaft 11c. A capstan 112d is provided so as to protrude from the upper surface of the key 112 on one side of the key fulcrum member 111a nearer to the rear end portion 112c of the key 112.

Owing to the weight of the mass body 113, the sliding member 113d contacts the first head 123, and the lower end of the second head 124 contacts a head portion of the capstan 112d. In the illustrated electromagnetic actuator 1, the plunger 11 is held in abutting contact with the key 112 and the mass body 113a so as to be separable therefrom depending upon operating states of the key 112 and the mass body 113.

The position of the plunger 11, namely, the displacement position of the movable core (the movable core 11a in FIG. 2), is detected by the displacement-position detecting portion 3 shown in FIG. 1 on the basis of detection voltages outputted by the main detection coil 13a and the auxiliary detection coil 13b.

In the electromagnetic actuator 1 of FIG. 9, the main detection coil 13a and the auxiliary detection coil 13b are wound on the forward coil 12a. Accordingly, where the electromagnetic actuator 1 operates as the forward electromagnetic actuator, the position of the movable core 11a can be detected.

On the other hand, where the electromagnetic actuator 1 operates as the backward electromagnetic actuator, the position of the plunger 11 is detected by changes in a mutual coupling degree of the main detection coil 13a and the backward coil 12b and in a mutual coupling degree of the auxiliary detection coil 13b and the backward coil 12b.

Alternatively, the position of the plunger 11 may be detected by supplying, in the displacement-position detection period, the PWM drive current for detecting the displacement position to the forward coil 12a. Further, the position of the plunger 11 may be detected by winding the main detection coil 13a and the auxiliary detection coil 13b on each of the forward coil 12a and the backward coil 12b.

In the keyboard apparatus described above, the characteristic of the reaction force of the electronic keyboard musical instrument can be made close to that of an acoustic piano by detecting not only the position of the plunger 11 but also the speed of the plunger 11. In this instance, the speed is detected by calculating a temporal change of the detected displacement position of the movable core 11a.

In the present embodiment, the operational state (such as the displacement position or speed) of the plunger 11 (the movable core 11a) is detected, and data (such as the stroke position, a key depression speed, etc.) is obtained on the basis of the detection result, whereby the drive control of the electromagnetic actuator 1 is executed.

Execution of computer programs by the CPU (not shown) realizes a function of controlling the drive force generated in the electromagnetic actuator 1 and a function of obtaining the stroke position of the key 112 and information as to the key operation such as the key depression speed.

Owing to the function of controlling the drive force, a directed value indicative of the drive force to be imparted to the key 112 by the electromagnetic actuator 1 is determined on the basis of the stroke position of the key 112 (i.e., the key position) and the information as to the key operation obtained by the function of obtaining the information as to the key operation. The electromagnetic actuator 1 selectively generates, as the drive force corresponding to the directed value, a drive force in a direction to increase the reaction force added from the mass body 113 (i.e., in the backward direction) with respect to the release operation of the key 112 and a drive force in a direction to reduce the reaction force added from the mass body 113 (i.e., in the forward direction) with respect to the depression operation of the key 112.

While the force sense control has been explained with reference to FIG. 9, automatic performance (automatic key operation) is possible where the electromagnetic actuator 1 operates as the forward electromagnetic actuator. In this instance, performance data (note-on message, note-off message) is read out from a music data file, and the electromagnetic actuator 1 is driven in the forward direction in accordance with the read performance data, thereby permitting the self weight of the key 112 to function as a drive force to depress the key 112.

The plunger 11 of the electromagnetic actuator 1 described above is held in contact with the key 112 and the mass body 113 via the first head 123 and the second head 124, respectively, so as to be separable from the key 112 and the mass body 113 depending upon behaviors thereof. The plunger 11 may be coupled to the key 112 and the mass body 113 by a linking device or the like so as not to be separable from the key 112 and the mass body 113 as long as the force can be transmitted from the plunger 11 to the key 112 and the mass body 113.

In place of the electromagnetic actuator in the electronic keyboard musical instrument not equipped with the mass body as disclosed in the Patent Literature 1 explained in the Discussion of the Related Art, there may be employed, as the electromagnetic actuator that is in contact with an associated key or coupled to the associated key so as not to be separable therefrom, the following arrangements: the electromagnetic actuator of the two-way driving type shown in FIG. 2; a single electromagnetic actuator of the one-way driving type shown in FIG. 4A; and two electromagnetic actuators of the one-way driving type shown in FIG. 4A which arranged such that the driving directions of the respective actuators with respect to the key are opposite. According to these arrangements, the sense force control and/or the automatic performance can be realized.

In the illustrated embodiment, the correction portion 33 of the displacement-position detecting portion 3 is configured to correct the displacement-position detection signal inputted thereto from the synchronous sampling circuit 32, in accordance with the PWM directed value from the drive control portion 4, and to output the corrected displacement-position detection signal. The displacement-position detecting portion 3 may be configured so as not to be equipped with the correction portion 33. This configuration will be explained as a modified embodiment of the present invention. In this modified embodiment, the same reference signs as used in the embodiment illustrated above are used to identify the corresponding components and a detailed explanation of which is dispensed with.

Figure 10:
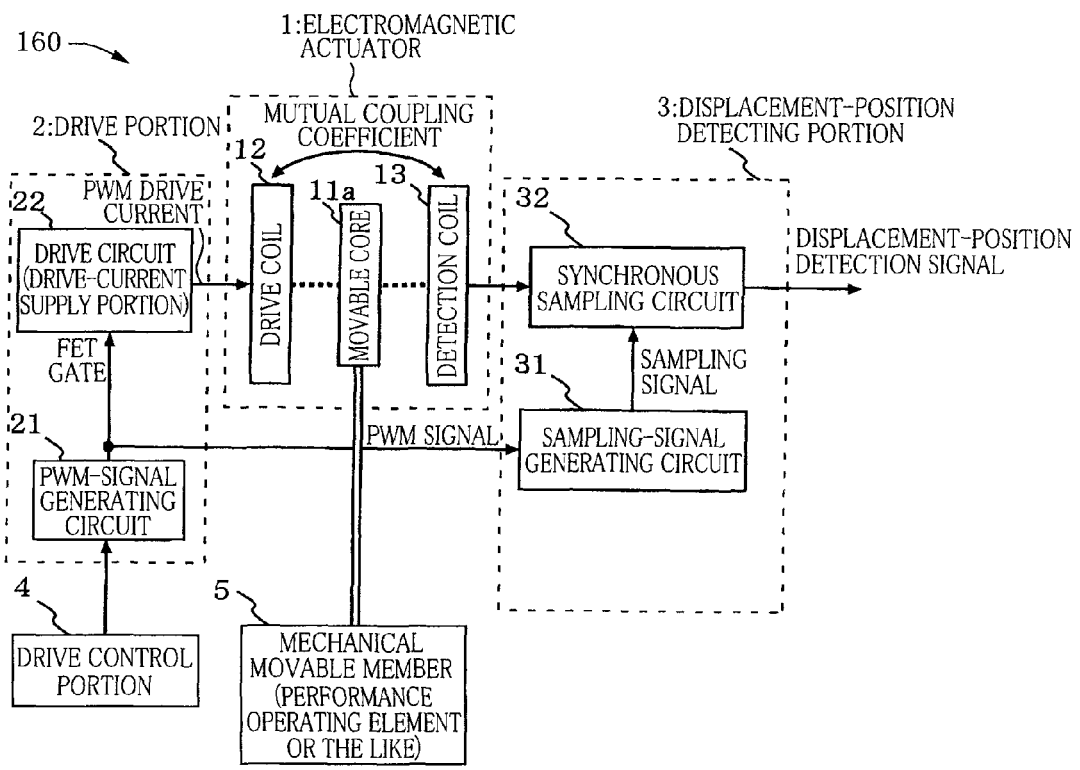
FIG. 10 is a functional block diagram for explaining a modified embodiment of the present invention.

FIG. 10 shows an apparatus for detecting a displacement of an electromagnetic actuator according to the modified embodiment, which is indicated at 160. As shown in FIG. 10, the drive control portion 4 is configured to output, to the drive portion 2, a directed value of the PWM signal (i.e., duty ratio). The drive portion 2 is configured to supply a drive current to the electromagnetic actuator 1. A displacement-position detection period in which the displacement position of the movable core 11a of the electromagnetic actuator 1 is detected is temporarily or periodically (e.g. at one cycle of ten cycles of the PWM signal) set within a period in which the movable core 11a is driven or is temporarily or periodically (e.g. at one cycle of ten cycles of the PWM signal) set within a non-driving period in which the movable core 11a is not driven, and the displacement position of the movable core 11a is detected in the displacement-position detection period. The non-driving period is a period in which electric current for driving the movable core 11a does not flow. The drive control portion 4 is configured to set, in advance, the duty ratio in the displacement-position detection period to a prescribed value (e.g., 20%) and to keep the prescribed value as the duty ratio throughout the displacement-position detection period. The PWM-signal generating circuit 21 is configured to output, in the displacement-position detection period, a PWM signal whose duty ratio is set to the prescribed value, and the drive circuit 22 is configured to supply, to the drive coil 12, a PWM current in accordance with the PWM signal. The sampling-signal generating circuit 31 is configured to output a sampling signal which is synchronized with the PWM signal, and the synchronous sampling circuit 32 is configured to sample the output voltage of the detection coil 13 and to output the displacement-position detection signal. Here, since the directed value of the PWM signal outputted from the drive control portion 4 is kept at the prescribed value, it is not needed for the displacement-position detecting portion 3 to consider a fluctuation, i.e., an increase or a decrease, of the output voltage of the detection coil 13 which would be otherwise caused by changing the directed value of the PWM signal for driving the drive coil 12. Therefore, where the duty ratio of the drive current for detecting the displacement position of the movable core 11a is set to a preset value, the correction portion 33 may be eliminated, enabling the displacement-position detecting portion 3 to be constructed at a low cost.

The above-described arrangement wherein the displacement-position detecting portion 3 is not equipped with the correction portion 33 may be realized by the following arrangement, for instance. Where, in the arrangement of FIG. 1, accuracy deterioration due to a fluctuation of the displacement-position detection signal caused by changing the duty ratio falls within a permissible range, the displacement of the movable core 11a can be detected on the basis of a drive current normally used for driving the drive coil 12, without setting or fixing the duty ratio at the prescribed value. In this instance, it is not needed to correct the output (the displacement-position detection signal) of the synchronous sampling circuit 32, so that the displacement position of the movable core 11a can be detected by the displacement-position detecting portion 3 without having the correction portion 33.

Each of the electromagnetic actuators explained with reference to FIGS. 1-8 and 10 may be utilized as a displacement-position detecting sensor. In this instance, a movable element or a contact element of a mechanical device is coupled to the movable core, and the displacement position of the movable element or the contact element is detected.

While the embodiments and examples of the present invention have been explained above, it is to be understood that the invention is not limited to the details of the illustrated embodiments and examples, but may be embodied with various other changes and modifications, which may occur to those skilled in the art, without departing from the scope of the invention defined in the appended claims.

What is claimed is:

1. An apparatus for detecting a displacement of an electromagnetic actuator, comprising:
   an electromagnetic actuator including: a movable core; a drive coil which causes a displacement of the movable core by giving a drive force to the movable core; and a detection coil which is disposed at a position where a mutual coupling coefficient with the drive coil changes in accordance with the displacement of the movable core, the electromagnetic actuator transmitting a drive force of the movable core to a mechanical system;
   a drive portion configured to supply a drive current to the drive coil, the drive current being synchronized with a pulse width modulation signal; and
   a displacement detecting portion to which an output voltage of the detection coil is inputted and which is configured to output a displacement detection signal corresponding to the displacement of the movable core,
   wherein the displacement detecting portion includes: a sampling-signal generating portion configured to generate a sampling signal in synchronism with the pulse width modulation signal; and a synchronous sampling portion configured to output the displacement detection signal by sampling the output voltage of the detection coil in synchronism with the sampling signal.

2. The apparatus according to claim 1,
   wherein the detection coil includes a main detection coil and an auxiliary detection coil,
   wherein, where a mutual coupling coefficient of the drive coil and the main detection coil changes, as a first characteristic, in accordance with the displacement of the movable core and a mutual coupling coefficient of the drive coil and the auxiliary detection coil changes, as a second characteristic, in accordance with the displacement of the movable core, the main detection coil and the auxiliary detection coil are disposed such that the first characteristic and the second characteristic differ from each other, and
   wherein the synchronous sampling portion is configured to sample an output voltage of the main detection coil and the auxiliary detection coil that are connected in reverse-polarity series such that polarity of the mutual coupling coefficient of the drive coil and the main detection coil and polarity of the mutual coupling coefficient of the drive coil and the auxiliary detection coil are opposite to each other.

3. The apparatus according to claim 2,
   wherein the main detection coil and the auxiliary detection coil are disposed with respect to the drive coil so as to be coaxial therewith, and
   wherein the main detection coil and the auxiliary detection coil are disposed so as to be arranged adjacent to each other in an axial direction of the drive coil.

4. The apparatus according to claim 3, wherein the main detection coil and the auxiliary detection coil are disposed such that opposite ends, in the axial direction, of a winding wire of the main detection coil and the auxiliary detection coil are located inside respective positions of opposite ends of a winding wire of the drive coil in the axial direction.

5. The apparatus according to claim 1, wherein the displacement detecting portion includes a correction portion configured to correct the displacement detection signal inputted thereto from the synchronous sampling portion, in accordance with a duty ratio of the pulse width modulation signal.

6. The apparatus according to claim 5,
wherein the drive portion is configured to set the duty ratio to a prescribed value in a displacement detection period that is a part of a period in which the movable core is driven by the drive portion,
wherein the sampling-signal generating portion is configured to generate, in the displacement detection period, a sampling signal which is synchronized with the pulse width modulation signal whose duty ratio is the prescribed value, and
wherein the correction portion is configured to correct the displacement detection signal inputted thereto from the synchronous sampling portion, in accordance with the duty ratio set to the prescribed value.

7. The apparatus according to claim 5, further comprising a drive control portion configured to output, to the drive portion and the correction portion, a duty ratio determined by the drive force that the movable core should generate,
wherein the drive portion includes:
a pulse width modulation signal generating circuit configured to output the pulse width modulation signal in accordance with the duty ratio outputted by the drive control portion; and
a drive circuit configured to supply, to the drive coil, the drive current which is synchronized with the pulse width modulation signal outputted from the pulse width modulation signal generating circuit, and
wherein the correction portion is configured to correct the displacement detection signal inputted thereto from the synchronous sampling portion, in accordance with the duty ratio outputted from the drive control portion.

8. The apparatus according to claim 1,
wherein the electromagnetic actuator further includes a yoke,
wherein the movable core is a columnar body and is linearly displaceable along an axial direction of the columnar body by being inserted through a hollow portion of each of the drive coil and the detection coil, a drive shaft being provided on at least one end face of the columnar body in the axial direction so as to protrude therefrom, for transmitting the drive force to the mechanical system, and
wherein the yoke is disposed outside the drive coil and the detection coil and has an opening portion through which the drive shaft protrudes.

9. The apparatus according to claim 1,
wherein the electromagnetic actuator includes an outer stationary core, an inner stationary core, and a connecting core which connects one end of the outer stationary core and one end of the inner stationary core to each other,
wherein a recess whose bottom is defined by the connecting core is formed between the outer stationary core and the inner stationary core,
wherein the drive coil and the detection coil are fitted in the recess,
wherein the movable core is a plate-like body and is disposed so as to be opposed to an opening portion of the recess via a clearance whose size changes in accordance with the displacement of the movable core, so that the movable core is linearly displaceable in an axial direction perpendicular to a plane of the plate-like body, and
wherein a drive shaft is provided on at least one surface of the plate-like body so as to protrude therefrom in the axial direction perpendicular to the plane of the plate-like body.

10. The apparatus according to claim 1,
wherein the electromagnetic actuator is constituted by a first electromagnetic actuator and a second electromagnetic actuator each of which has the drive coil,
wherein the first electromagnetic actuator and the second electromagnetic actuator have a single movable core common thereto,
wherein the first electromagnetic actuator and the second electromagnetic actuator are disposed so as to be arranged in a direction of a displacement of the single movable core, and
wherein the first electromagnetic actuator is configured to drive the single movable core in one direction while the second electromagnetic actuator is configured to drive the single movable core in a direction opposite to the one direction.

11. The apparatus according to claim 10, wherein the detection coil is provided in at least one of the first electromagnetic actuator and the second electromagnetic actuator.

12. The apparatus according to claim 1,
wherein the drive portion includes:
a pulse width modulation signal generating circuit configured to output the pulse width modulation signal; and
a drive circuit configured to supply, to the drive coil, the drive current which is synchronized with the pulse width modulation signal outputted from the pulse width modulation signal generating circuit, and
wherein the sampling-signal generating portion is configured to generate the sampling signal in a period from rise timing to fall timing of the drive current in a rectangular wave which is synchronized with the pulse width modulation signal.

13. The apparatus according to claim 1,
wherein the drive portion includes:
a pulse width modulation signal generating circuit configured to output the pulse width modulation signal; and
a drive circuit configured to supply, to the drive coil, the drive current which is synchronized with the pulse width modulation signal outputted from the pulse width modulation signal generating circuit,
wherein the detection coil is configured to output a voltage in a rectangular wave energized by the drive current in a rectangular wave which is synchronized with the pulse width modulation signal, and
wherein the synchronous sampling portion is configured to sample the output voltage of the detection coil immediately before fall timing of the voltage in the rectangular wave outputted from the detection coil.

14. The apparatus according to claim 1,
wherein the drive portion is configured to set a duty ratio of the pulse width modulation signal to a prescribed value in a displacement detection period that is a part of a period in which the movable core is driven by the drive portion,
wherein the sampling-signal generating portion is configured to generate, in the displacement detection period, a sampling signal which is synchronized with the pulse width modulation signal whose duty ratio is the prescribed value, and wherein the synchronous sampling portion is configured to output the displacement detection signal by sampling the output voltage of the detection coil in synchronism with the sampling signal.

* * * * *